United States Patent
Pajovic et al.

(10) Patent No.: US 10,425,910 B1
(45) Date of Patent: Sep. 24, 2019

(54) LOCALIZATION USING MILLIMETER WAVE COMMUNICATION SIGNALS

(71) Applicant: Mitsubishi Electric Research Laboratories, Inc., Cambridge, MA (US)

(72) Inventors: Milutin Pajovic, Cambridge, MA (US); Toshiaki Koike Akino, Belmont, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 12 days.

(21) Appl. No.: 15/924,538

(22) Filed: Mar. 19, 2018

(51) Int. Cl.
| | |
|---|---|
| *H04W 64/00* | (2009.01) |
| *H04L 25/02* | (2006.01) |
| *H04B 17/318* | (2015.01) |
| *H04B 7/06* | (2006.01) |

(52) U.S. Cl.
CPC ........... *H04W 64/00* (2013.01); *H04B 7/0617* (2013.01); *H04B 17/318* (2015.01); *H04L 25/0202* (2013.01)

(58) Field of Classification Search
CPC . H04W 64/00; H04W 24/08; H04W 72/0453; H04L 1/0071
USPC ...................................................... 455/456.1
See application file for complete search history.

(56) References Cited

U.S. PATENT DOCUMENTS

| | | | |
|---|---|---|---|
| 6,195,556 B1 | 2/2001 | Reudink et al. | |
| 9,531,446 B2* | 12/2016 | Sadeghi | ................ H04W 16/28 |
| 2017/0222704 A1 | 8/2017 | Eitan et al. | |
| 2017/0299689 A1* | 10/2017 | Va | ......................... G01S 5/0252 |

(Continued)

OTHER PUBLICATIONS

Lemic et al., "Localization as a feature of mmWave communication." 2016 International Wireless Communications and Mobile Computing Conference (IWCMC). Conference Sep. 5-9, 2016 . IEEE, Paphos, Cyprus.

(Continued)

*Primary Examiner* — Charles N Appiah
*Assistant Examiner* — Frank E Donado
(74) *Attorney, Agent, or Firm* — Gennadiy Vinokur; James Mcaleenan; Hironori Tsukamoto

(57) ABSTRACT

A millimeter-wave (mmWave) communication system for determining a location of a first device based on a known location of a second device includes a transceiver connected to a set of antennas to communicate beams of mmWaves and to perform an estimation of a channel connecting the first device and the second device and a memory to store results of the channels estimation including pairs of beam values, wherein each pair of beam values includes a beamforming angle and an energy of the beam communicated with the beamforming angle. The system also includes a processor operatively connected to the memory and configured to select from the memory multiple pairs of beam values corresponding to beamforming communication sharing the same dominant path connecting the first device and the second device, to determine a direction of the dominant path by evaluating a beamforming model for the selected pairs of beam values, and to determine the location of the first device arranged along the direction of the dominant path with respect to the location of the second device.

20 Claims, 30 Drawing Sheets

(56) References Cited

U.S. PATENT DOCUMENTS

| | | | |
|---|---|---|---|
| 2017/0303263 A1* | 10/2017 | Islam | H04B 7/0408 |
| 2017/0318429 A1 | 11/2017 | Roberts et al. | |
| 2018/0234157 A1* | 8/2018 | Liang | H04B 7/0695 |
| 2018/0269934 A1* | 9/2018 | Kim | H04B 7/0417 |

OTHER PUBLICATIONS

Shahmansoori et al., "Position and Orientation Estimation through Millimeter Wave MIMO in 5G Systems," IEEE Transactions on Wireless Communications ( vol. 17 , Issue: 3 , Mar. 2018 ). IEEE Communications Society IEEE Signal Processing Society . Dec. 27, 2017, pp. 1822-1835.

* cited by examiner

LOCALIZATION USING MILLIMETER WAVE COMMUNICATION SIGNALS

TECHNICAL FIELD

This invention relates generally to communications systems, and more particularly to mmWave-based indoor localization system.

BACKGROUND

Millimeter Waves (mmWaves) are radio waves with wavelength in the range of 1 millimeter (mm)-10 mm, which corresponds to a radio frequency of 30 GigaHertz (GHz)-300 GHz. Per the definition by the International Telecommunications Union (ITU), these frequencies are also referred to as the Extremely High Frequency (EHF) band.

The mmWaves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., rain drops) in the air. On the other hand, due to the smaller wavelengths of the mmWaves, more antennas may be packed in a relatively small area, thereby allowing for the implementation of a high-gain antenna in small form factor.

The mmWaves have been less utilized than the lower frequency radio waves. A vast amount of spectrum is available in the mmWave band. For example, the frequencies around 60 GHz, which are typically referred to as the 60 GHz band, are available as unlicensed spectrum in most countries.

The technical field of indoor localization deals with developing systems and methods for localizing an object in an enclosed indoor area. The object can be a device that transmits and/or receives signals to/from some other device(s), or an entity without such a capability. The localizing refers to estimating the coordinates of an object in some pre-defined reference frame. Alternatively, localization can be framed as a proximity detection problem, where one aims to localize an object at a sub-area level, within a larger indoor area. A number of applications require precise indoor localization, such as locating people and resources in hospitals, warehouses, shopping malls, factories, to name a few. For example, a paradigm of technology-assisted living is built upon accurate localization.

A well-known solution for outdoor localization, known as Global Positioning System (GPS), is ineffective indoors because the electromagnetic waves transmitted from the satellites in the GPS constellation do not penetrate indoors.

A number of approaches in indoor localization require installing dedicated hardware in an indoor area. While this approach also has potential to yield accurate location estimates, it is undesirable because of the cost and the fact that a dedicated system is needed for localization task. An example of this approach is ultra-wide band (UWB) radio localization systems, commercially available, but relatively expensive and used only as a last resort. Other examples include systems based on lidar, radar or ultrasound, with usually high accuracy, but also high installation and maintenance cost. In the area of mmWave communication, the system described in CN102914762A discloses a mmWave-based indoor localization system. However, that system requires installation of a dedicated infrastructure operating at mmWave frequencies.

The infrastructure used for localization plays a major role in the selection of indoor localization method, along with the accuracy that can be achieved. For example, infrastructure-free indoor localization that does not require fingerprinting is a desirable approach from the cost and implementation perspectives. Such systems exploit an already existing infrastructure dedicated for some other tasks. A representative example is WiFi infrastructure, where the access points are dedicated for enabling wireless connectivity in a local area network. These methods usually rely on path loss modeling of propagation of the WiFi signals, see, e.g., U.S. Pat. No. 9,282,531. However, the principles of mmWave communications are very different from communication in the lower frequencies, and the existing methods suitable for WiFi signals are impractical for mmWave localization.

SUMMARY

Some embodiments are based on recognition that a millimeter wave (mmWave) channel has several specific properties of propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile. Further, due to high path-loss of mmWave signal propagation, the mmWave communication systems communicate with beams of mmWaves formed using a beamforming procedure with a specific beamforming angle. As used herein, each beamforming angle includes one or combination of an angle of departure of a communicated beam and an angle of arrival of the communicated beam.

Accordingly, a growing number of mmWave communication systems estimate the mmWave channel for exploiting different properties of mmWaves propagation. The channel estimation includes beam training to find a path between transmitter and receiver over which the communication link can be established. During the beam training, the transmitter and receiver probe a certain number of beams transmitted with different beamforming angles. For example, during the beam training, the transmitter sends training sequence in each beam sequentially and the receiver steers sequentially in all tested beams and measures strength of the signal from each steered beam.

In such a manner, results of the mmWave channel estimation include pairs of values, referred herein as beam values. Each pair of beam values includes a beamforming angle and an energy of the beam communicated with the beamforming angle. For example, if during the channel estimations, the beams are communicated over ten different beamforming angles and the energy of such beamforming transmissions are measured, then the results of the mmWave channel estimation include ten pairs of beam values. Typically, the pair of beam values with the highest value of energy received during the channel estimation is selected for subsequent communication of the data.

In some communication systems, the results of mmWave channel estimation are computed in a medium access control (MAC) layer of the communication protocol used by the mmWave communication systems. To that end, it is an objective of some embodiments to localize a device configured to communicate within mmWave spectrum using information retrieved from the MAC layer.

In theory, the beamforming angle in the pair of beam values with the highest value of energy corresponds to the direction of the shortest path connecting two devices. Thus, if the location of one device is known, which is the case for example when the device is an access point, the location of another device can be located on the path specified by that beamforming angle. Various techniques can be used to determine distance between the devices when the angle of the path connecting the devices is known. For example, time-of-flight or pass-loss model of mmWave propagation can be used.

In practice, however, the beamforming angle in the pair of beam values with the highest value of energy does not correspond to the direction of the shortest path connecting two devices. This is because the channel estimation is performed with a resolution that can be sufficient for the purposes of mmWave communication, but may be insufficient, i.e., too low, for detecting the dominant path connecting two devices and/or for the accurate localization.

For example, let say that the direction of the path connecting two devices is 37 degrees in some coordinate system and the resolution of the beamforming is 5 degrees. Such a resolution defines a separation between neighboring beamforming angles used for channel estimation. To that end, in this example, during the channel estimation, the beams are steered over the beamforming angles that are multiple of 5 degrees. Thus, in this example, the channel estimation is likely to determine that the beamforming angle of 35 degrees corresponds to the beam with the highest value of energy, because the angle of 35 degrees is closest to the angle of the path connecting the two devices.

In our example, if beam of mmWave is a narrow ray of radiation, such a beam transmitted from one device would not reach the second device at all. However, the beams of mmWaves are spread in angular domain according to a specific power profile. To that end, such a beam transmitted from one device over the angle of 35 degrees can reach another device located over the angle of 37 degrees with relatively high energy that can be sufficient for data communication. That is one of the reasons why a number of mmWaves communication systems do no use high-resolution channel estimation.

However, even if the direction of the path connecting two devices is determined incorrectly, the energy of the beam transmitted over the path deviating from the dominant path still reaches the receiver over the dominant path due to the beam spreading. The methods for determining the distance between the two devices, such as time-of-flight or pass-loss methods, provide an accurate result only over the dominant path. Thus, the deviation of the beamforming angle from the dominant path results in errors in both direction and distance determinations, and can amount to an error unacceptable for some localization-based applications.

Some embodiments are based on realization that there is a relationship between the energy received over the dominant path from the beam transmitted with the beamforming angle and a deviation of the beamforming angle from the direction of the dominant path. Such a relationship depends on a hardware used to form the beam and a distance between the two devices, but potentially can be used to estimate the direction of the dominant path. Such a relationship is referred herein as a beamforming model relating a deviation of a beamforming angle from the dominant path with the energy of the beam transmitted with the beamforming angle and received over the dominant path.

However, such a beamforming model is underdetermined and includes ambiguity due to unknown distance between the devices. However, some embodiments are based on realization that multiple beam values determined during channel estimation share the same dominant path. For example, in the abovementioned example, it is likely that the beamforming transmission with beamforming angles of 35 and 40 degrees share the same dominant path of 37 degrees. Thus, some embodiments use these multiple beam values to resolve the ambiguity of the beamforming model and to determine the direction of the dominant path.

In some situations, the dominant path is the shortest path connecting two devices. However, due to the reflections of the transmitted beams of mmWaves, the mmWave channel is sparse in the number of arrivals of mmWaves impinging upon the receiver array, and can have multiple distinctive dominant paths connecting transmitter and receiver devices. To that end, the dominant path is the shorted path connecting two devices within an angle defined by two or multiple beamforming angles. For example, in indoor environment, the mmWave channel between two devices can have 3-5 dominant paths.

After the direction of the dominant path is determined, some embodiments determine a distance between the devices, and determine the location of one device based on the distance along the direction of the dominant path from another device with known location. For example, one embodiment obtains a time-of-flight of propagation of the beam over the dominant path and determines the distance between the first and the second devices based on the time-of-flight. Another embodiment determines the distance using a path-loss model of mmWave signal propagation along the direction of the dominant path with the energy of the beam transmitted with the beamforming angle closest to the direction of the dominant path. Yet another embodiment determines multiple dominant paths and uses the triangulation of the dominant paths to determine the location of the device.

Accordingly, one embodiment discloses a millimeter-wave (mmWave) communication system for determining a location of a first device based on a known location of a second device, including a transceiver connected to a set of antennas to communicate beams of mmWaves and to perform an estimation of a channel connecting the first device and the second device by comparing energy of beams communicated using mmWave beamforming over different beamforming angles separated according to a resolution of the beamforming; a memory to store results of the channels estimation including pairs of beam values, wherein each pair of beam values includes a beamforming angle and an energy of the beam communicated with the beamforming angle; and a processor operatively connected to the memory and configured to select from the memory multiple pairs of beam values corresponding to beamforming communication sharing the same dominant path connecting the first device and the second device; determine a direction of the dominant path by evaluating a beamforming model for the selected pairs of beam values, wherein the beamforming model relates a deviation of a beamforming angle from the dominant path with the energy of the beam transmitted with the beamforming angle and received over the dominant path; and determine the location of the first device arranged along the direction of the dominant path with respect to the location of the second device.

Another embodiment discloses a method for determining a location of a first device based on a known location of a second device using millimeter-wave (mmWave) beamforming, wherein the method uses a processor coupled with stored instructions implementing the method, wherein the instructions, when executed by the processor carry steps of the method including estimating a channel connecting the first device and the second device by comparing energy of beams communicated using the mmWave beamforming over different beamforming angles separated according to a resolution of the beamforming to produce results of the channels estimation including pairs of beam values, wherein each pair of beam values includes a beamforming angle and an energy of the beam communicated with the beamforming angle; selecting multiple pairs of beam values corresponding to beamforming communication sharing the same dominant path connecting the first device and the second device; determining a direction of the dominant path by evaluating a beamforming model for the selected pairs of beam values, wherein the beamforming model relates a deviation of a beamforming angle from the dominant path with the energy of the beam transmitted with the beamforming angle and received over the dominant path; and determining the location of the first device arranged along the direction of the dominant path with respect to the location of the second device using at least some of the results of the channels estimation.

Yet another embodiment discloses a non-transitory computer readable storage medium embodied thereon a program executable by a processor for performing a method, the method includes estimating a channel connecting the first device and the second device by comparing energy of beams communicated using the mmWave beamforming over different beamforming angles separated according to a resolution of the beamforming to produce results of the channels estimation including pairs of beam values, wherein each pair of beam values includes a beamforming angle and an energy of the beam communicated with the beamforming angle; selecting multiple pairs of beam values corresponding to beamforming communication sharing the same dominant path connecting the first device and the second device; determining a direction of the dominant path by evaluating a beamforming model for the selected pairs of beam values, wherein the beamforming model relates a deviation of a beamforming angle from the dominant path with the energy of the beam transmitted with the beamforming angle and received over the dominant path; and determining the location of the first device arranged along the direction of the dominant path with respect to the location of the second device using at least some of the results of the channels estimation.

DETAILED DESCRIPTION

Figure 1:
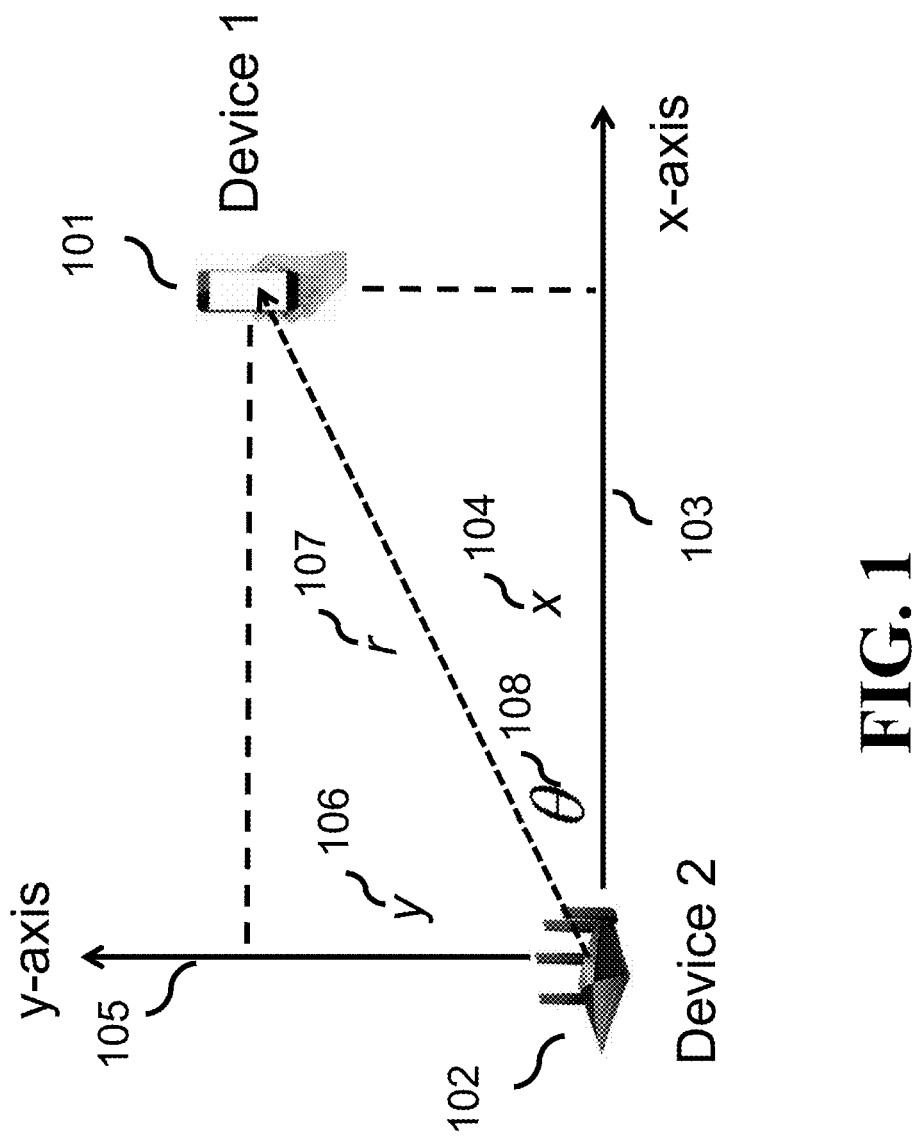
FIG. 1 shows a schematic of two devices, Device 1 and Device 2, that wirelessly communicate using millimeter-wave frequency range according to some embodiments.

FIG. 1 shows a schematic of two devices, Device 1 and Device 2, that wirelessly communicate using millimeter-wave frequency range according to some embodiments. Without loss of generality, in this example, Device 1 is a mobile terminal 101, while Device 2 is an access point 102, base station or some other mobile terminal. The location of Device 2 is known in advance, while the location of Device 1 is unknown. Some embodiments disclose methods to estimate the location of Device 1 with respect to Device 2. This location can be expressed as the coordinates of Device 1 in the coordinate system associated with Device 2. In the two-dimensional geometry, the coordinate system is defined with x-axis 103 and y-axis 105 so that the location of Device 1 is given by the coordinates x 104 and y 106. Alternatively, the location of Device 1 can be reported as the distance r 107 from Device 2 and bearing θ 108. The extension to the three-dimensional geometry is straightforward and used by various embodiments.

Figure 2:
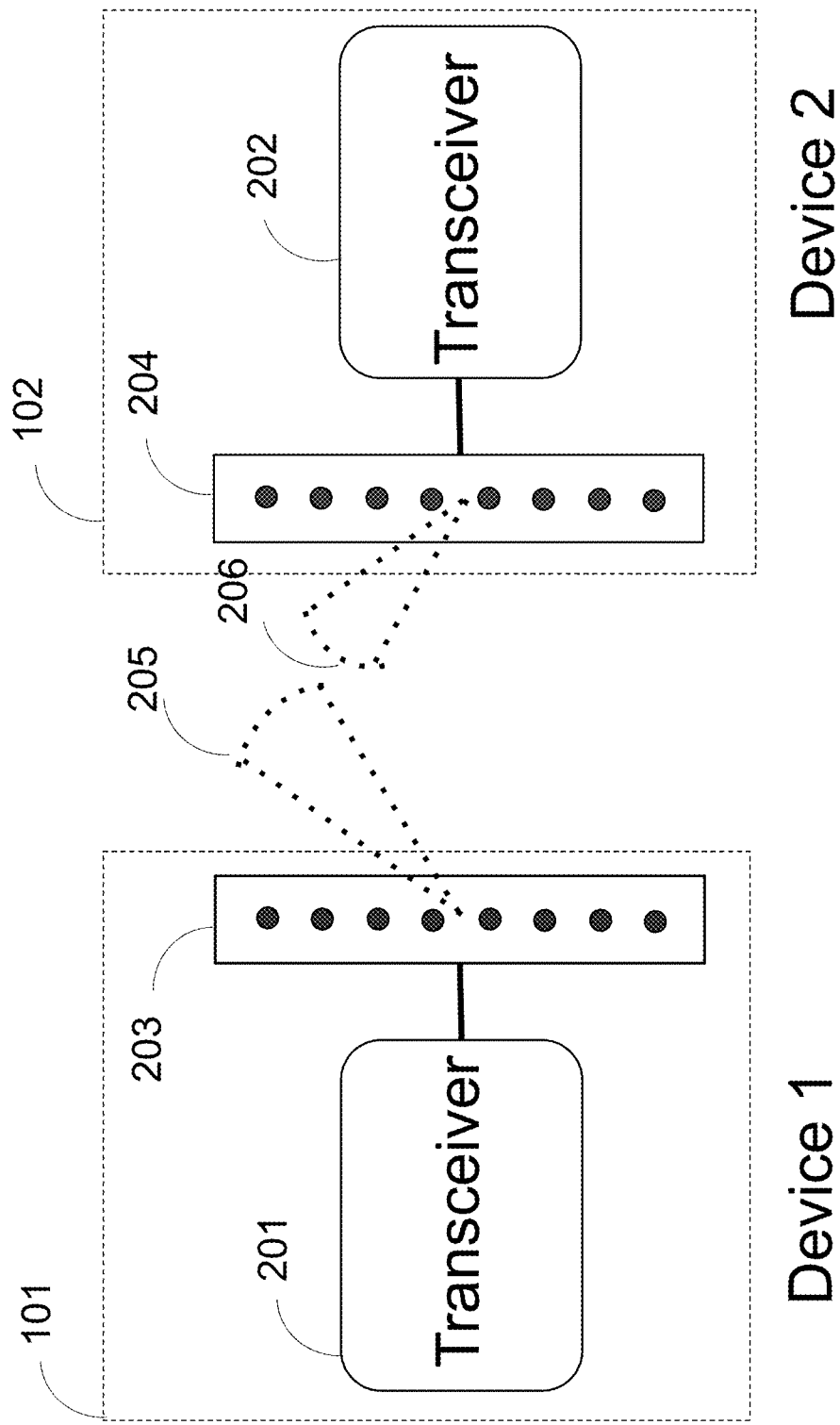
FIG. 2 shows a schematic of exemplar structures of the devices of FIG. 1.

FIG. 2 shows a schematic of exemplar structures of the devices of FIG. 1. For example, the devices 101 and 102 implement mmWave communication using transceivers 201 and 202, meaning that the data exchange between the two devices can occur in either direction. Each transceiver 201 and 202 is connected to a set of antennas 203 and 204, respectfully, capable of producing beams 205 and 206, i.e., transmitting/receiving mmWave signal to/from some desired direction, up to beamforming resolution. Examples of antennas include, without limitations, linear phased arrays, planar phased arrays, cylindrical phased arrays, horn antennas, etc.

Two mmWave devices, such as the devices 101 and 102, establish mmWave communication link using beams. This is because the mmWaves quickly attenuate even when they propagate along a line of sight between two devices, let alone when they reflect from surfaces or penetrate through obstacles such as walls and cubicle partitions. Therefore, to close a link between two devices, the devices need to steer beams along the path that imposes the smallest attenuation to the mmWave signal. To that end, during the channel estimation, the devices aim to find such a path to establish the mmWave link.

Figure 3:
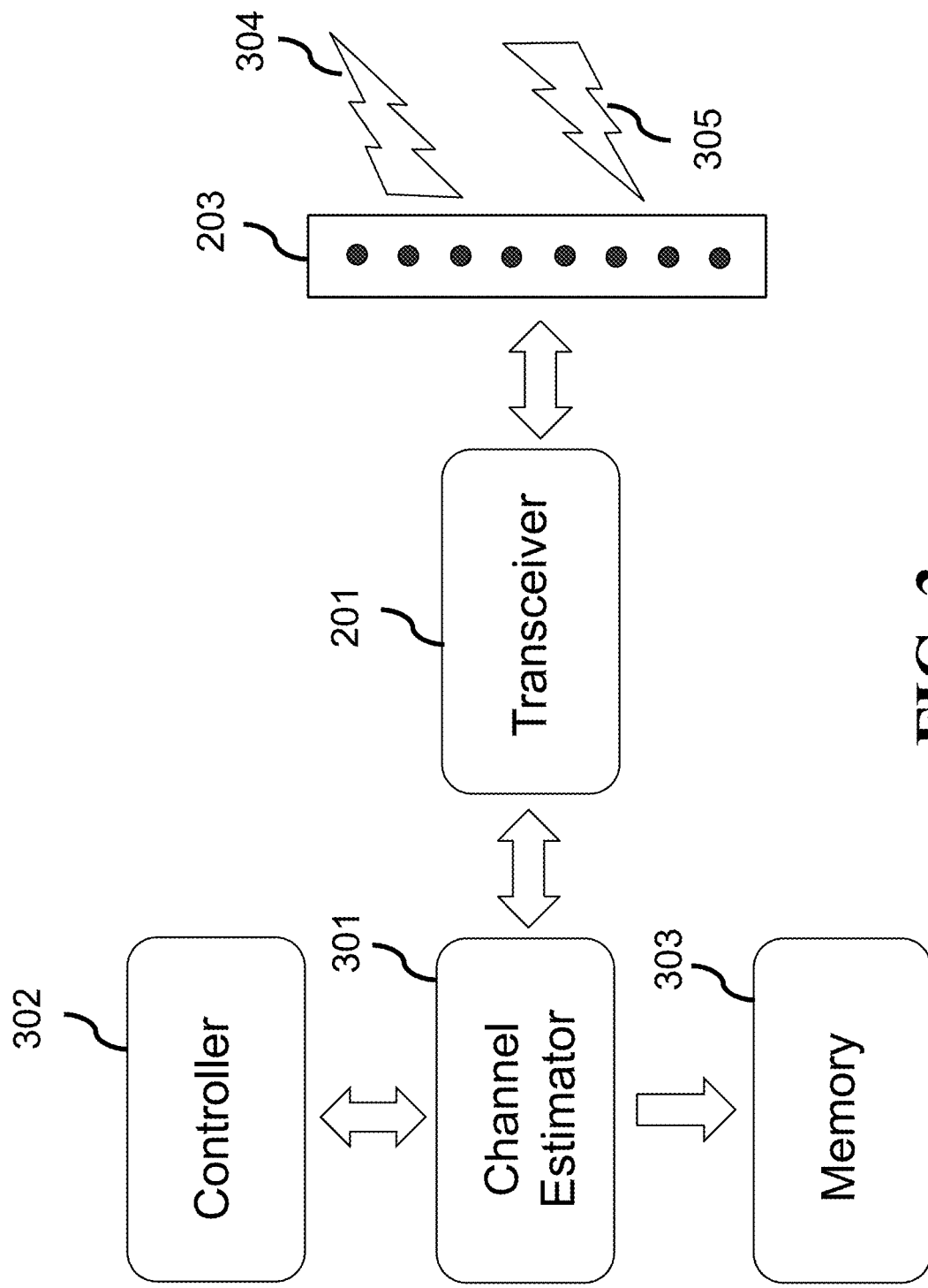
FIG. 3 shows a block diagram of the channel estimation stage used by a device 101 according to some embodiments.

FIG. 3 shows a block diagram of the channel estimation stage used by a device 101 according to some embodiments. The controller 302 implements a channel estimation protocol, executed in the channel estimator 301. The transceiver 201, connected with the antenna 203, transmits or receives pilot signals in a transmit 304 or receive 305 beam direction. On a high level, during the channel estimation stage, the two devices send and receive pilot signals along all possible beam combinations. The controller 302 instructs which beam combination is tested at a given time slot. The results of the channel estimation are recorded in memory 303.

Figure 4:
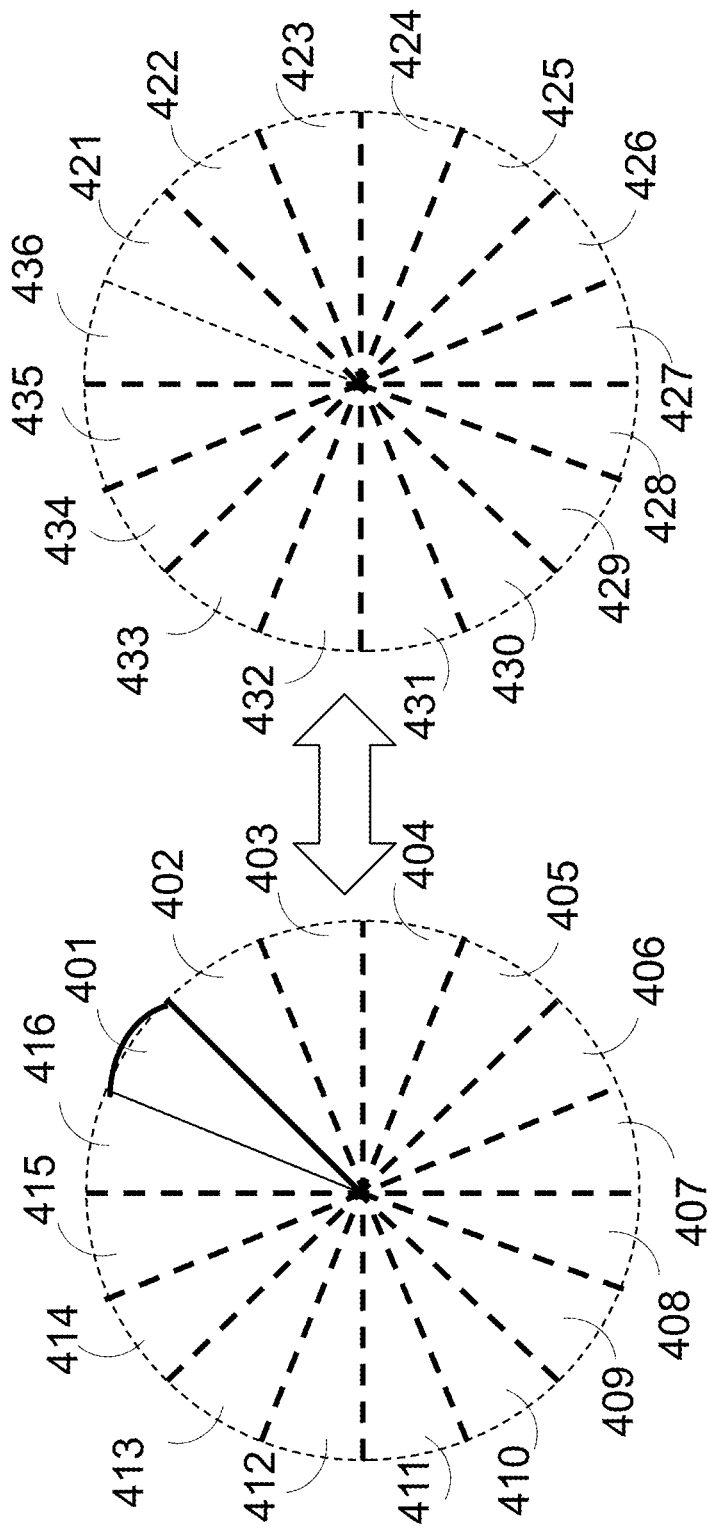
FIG. 4 shows a schematic illustrating an exemplar channel estimation resolution defining the transmit and received directions used by some embodiments.

FIG. 4 shows a schematic illustrating an exemplar channel estimation resolution defining the transmit and received directions used by some embodiments. In this example, the Device 1 sends pilot signal in all transmit directions, one direction at a time. The Device 2 receives the pilot signal from all possible receive directions, one direction at a time. Specifically, the Device 1 sends the pilot signal in the direction defined by beam 401 during multiple time slots. In one time slot, the Device 2 receives the signal from direction 421 and records the received signal quality. In the next time slot, the Device 2 receives signal from the direction defined by beam 422 and records the received signal quality. The Device 2 keeps on receiving and measuring signal energy from directions 423, 424, 425, 426, 427, 428, 429, 430, 431, 432, 433, 434, 435, and 436, i.e., until all directions are tried.

The Device 1 then repetitively transmits the pilot signal along beam 402 in multiple time slots. The Device 2 receives and measures signal quality along the beams 421, 422, . . . , 436, where one beam is tried in each time slot. The whole process continues until both devices send and receive signals along all possible beams. Thus, assuming the number of transmit and receive beams are, respectively, $G_t$ and $G_r$, this scheme requires $G_t \times G_r$ channel uses for probing all possible transmit and receive beam pairs. The receiver measures signal quality via, for example, signal-to-noise ratio (SNR) for each beam pair. The beam pair yielding the largest SNR is the one which determines steering angles the devices need to employ to establish the communication link. In such a manner, the Device 1 transmits beams for different transmit directions 401, 402, 403, 404, 405, 406, 407, 408, 409, 410, 411, 412, 413, 414, 415, and 416, which for each of the transmit direction, Device 2 measures the energy for each receive direction 421-436. As used herein, the transmit direction can be defined by an angle of departure (AoD) of a beam, while the receive direction can be defined by an angle of arrival (AoA) of the beam.

Figure 5A:
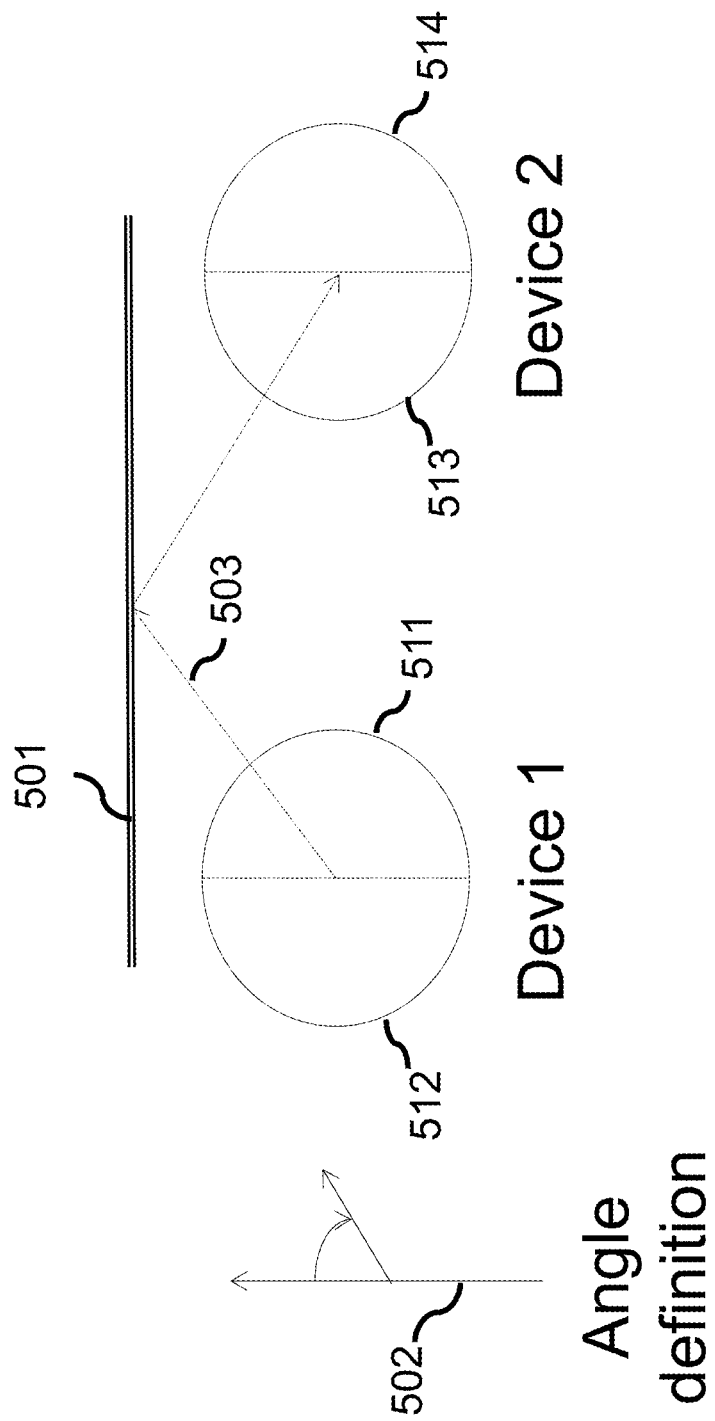
FIG. 5A shows a schematic of one stage of a multi-level beam training used by some embodiments.

FIG. 5A shows a schematic of one stage of a multi-level beam training used by some embodiments to reduce the burden of probing all possible transmit and receive beams. The multi-level beam training starts with transmitting and receiving the pilot signal with wide beams and proceeds with channel probing using higher resolution beams. Referring to FIG. 5A, assume two-dimensional geometry and that the best communication link between the Device 1 and Device 2 can be established along the path 503, bounced off from a reflector 501. The angle reference 502 is defined with respect to the vertical axis pointing upwards. The multi-level beam training works as follows.

The Device 1 first probes the channel with beam 511 covering the angles (0°,180°) during two consecutive time slots. The Device 2 steers beam 513, covering angles (180°, 360°) in the first time slot, and 514, covering angles (0°, 180°) in the second time slot and measures the quality of the received signal at the end of each time slot. The Device 1 then transmits the pilot signal along beam 512, covering angles (180°,360°) in two consecutive time slots. The Device 2 again receives and measures signal quality coining from beams 513 and 514. Given those four signal quality measurements, the Device 2 determines that the link between the two devices should be established using transmit beam 511 and receive beam 513.

Figure 5B:
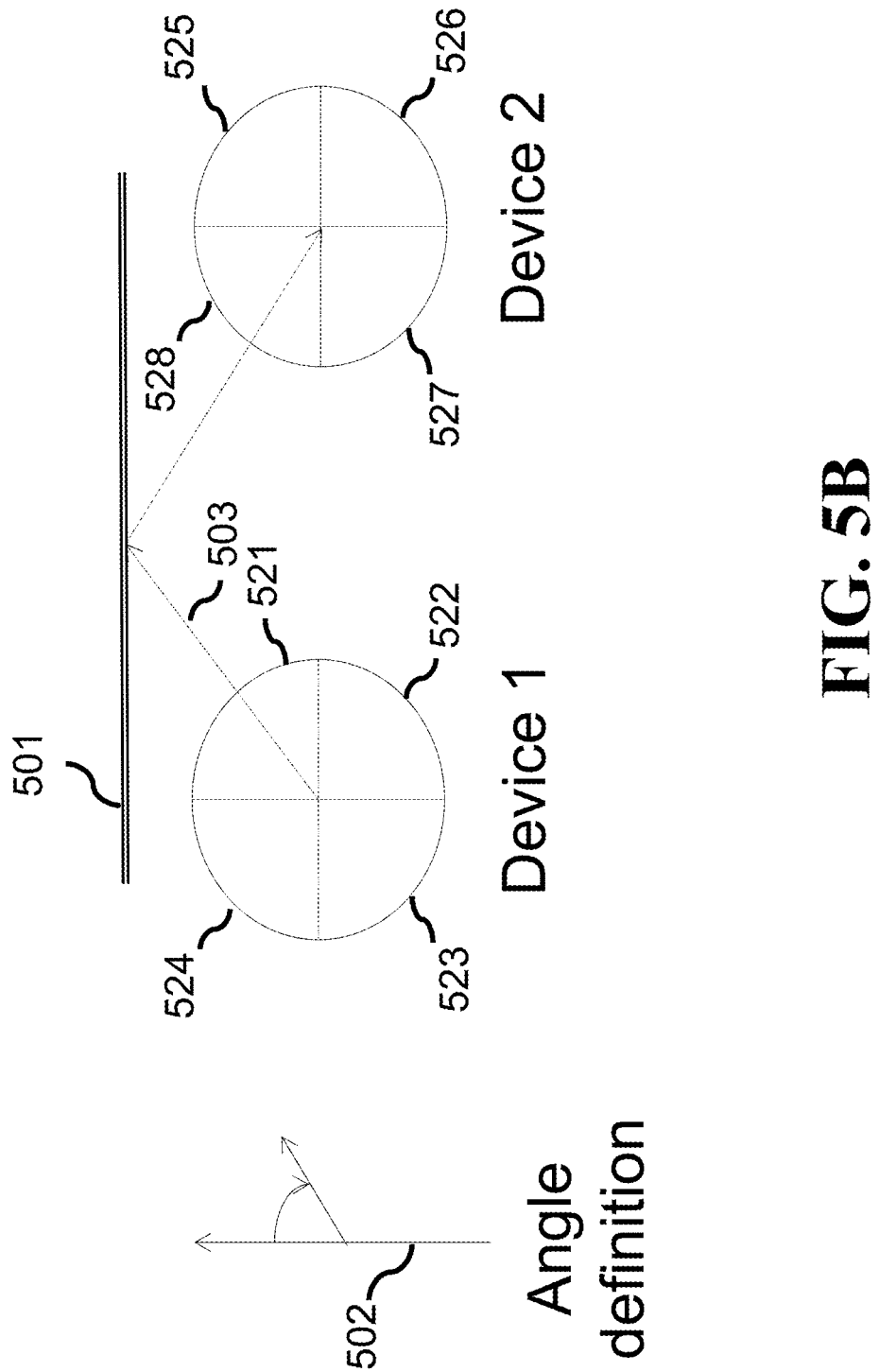
FIG. 5B shows a schematic of another stage of the multi-level beam training used by some embodiments.

FIG. 5B shows a schematic of another stage of the multi-level beam training used by some embodiments. For example, the next stage of the multi-level beam training includes transmitting a certain number of higher resolution beams within the transmit beam determined from the previous stage, and receiving with a certain number of higher resolution beams within the receive beam determined from the previous stage. As an illustration shown in FIG. 5B, Device 1 probes channel with the beam 521, covering the angles (0°,90°), and probes the channel with the beam 522, covering the angles (90°,180°). Similarly, the Device 2 receives the pilot signals by steering beam 528, covering the angles (270°,360°) and steering beam 527, covering the angles (180°,270°). This stage is concluded by the decision that the best transmit and receive beams are 521 and 528, respectively. Notably, sending beams 524 and 523, and receiving by steering towards 525 and 526 is avoided in the multi-level beam training scheme, which saves time, channel resources and consumed power.

Figure 6A:
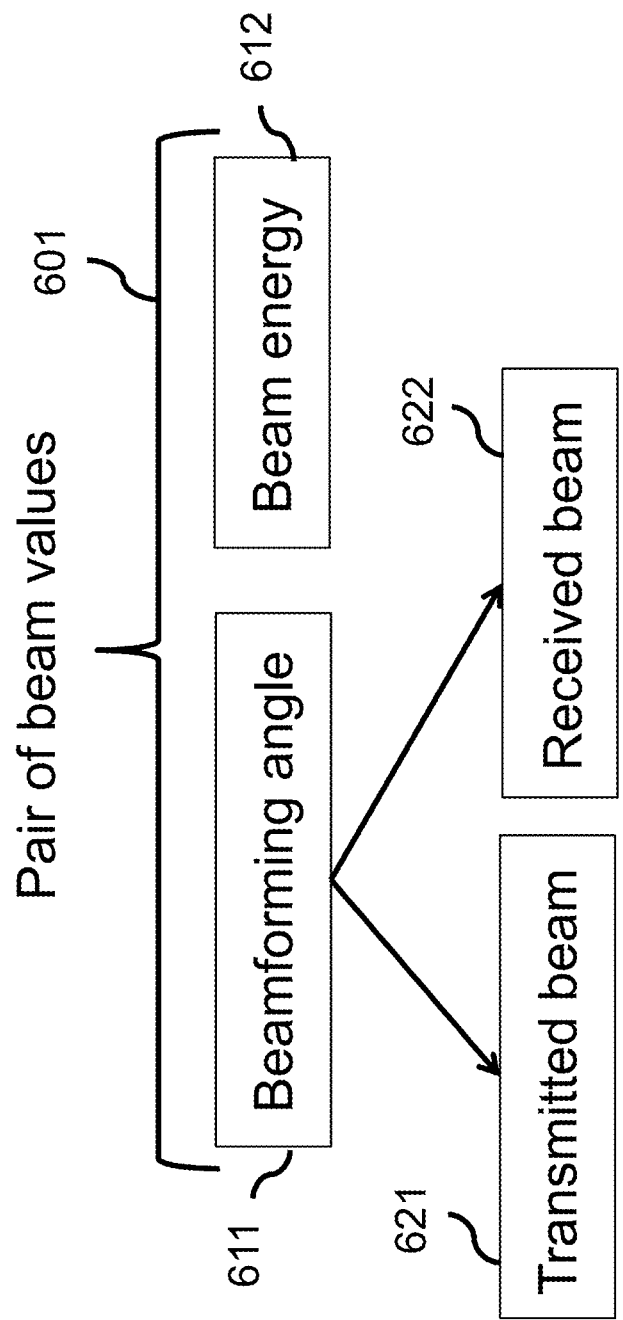
FIG. 6A shows a schematic illustrating the channel estimation used by some embodiments.

FIG. 6A shows a schematic illustrating the channel estimation used by some embodiments. Overall, the channel estimation stage results in a number of pairs of beam values 601. The first element 611 in the beam pair includes angles, such as AoD and AoA angles defining transmit 621 and receive 622 beams. The second element 622 is some quality measure of that particular transmit-receive beams. The link quality can be measured with SNR, signal strength, etc. The pairs of beam values are stored in memory 303.

Figure 6B:
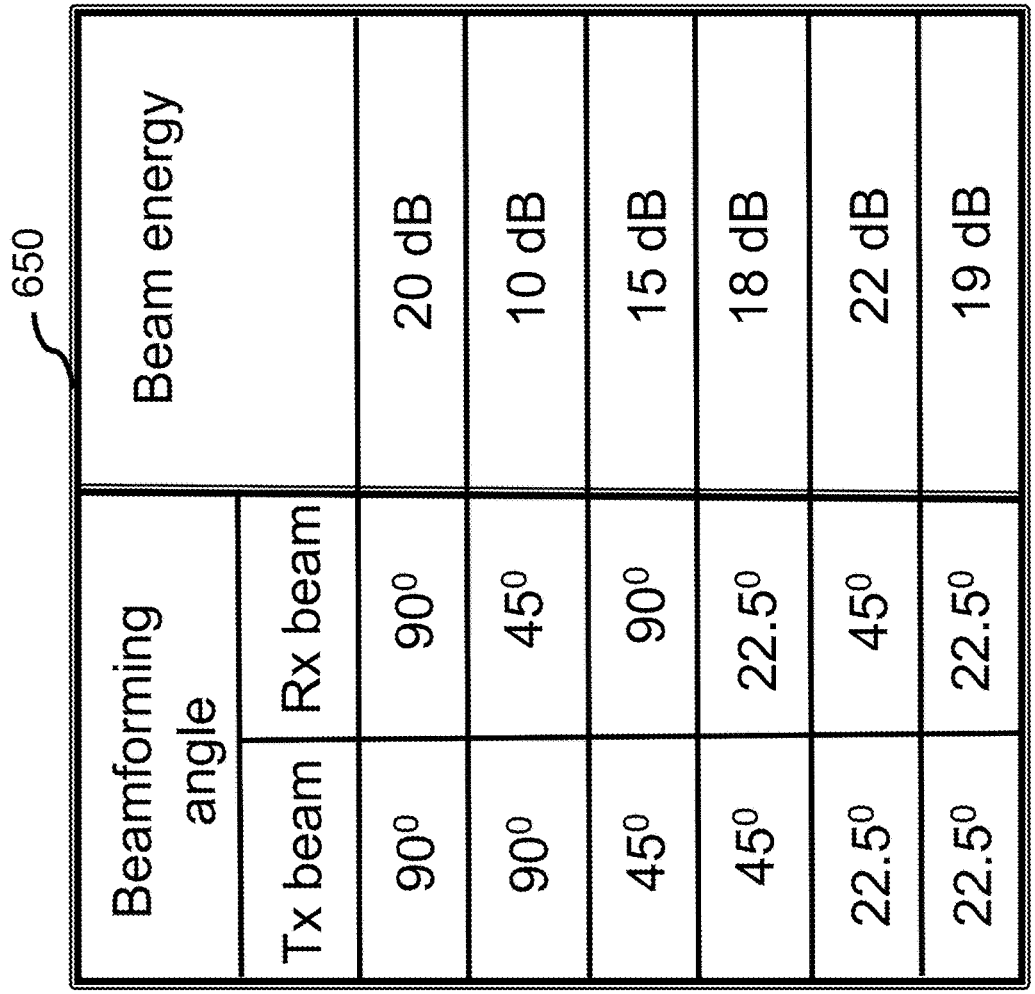
FIG. 6B shows a table storing examples of pair of beam values determined according to some embodiments.

FIG. 6B shows a table storing examples of pair of beam values determined according to some embodiments. In such a manner, the information stored in the memory has a tabular form 650. The communication link between two devices is established along the path defined by the transmit and receive beam, whose corresponding link quality is the best. For example, the measurements stored in 650 indicate the best link is established when the transmitter and receiver steer beams towards 22.5° and 45°, respectively.

In theory, the beamforming angle in the pair of beam values with the highest value of energy corresponds to the direction of the shortest path connecting two devices. Thus, if the location of one device is known, which is the case for example when the device is an access point, the location of another device can be located on the path specified by that beamforming angle. Various techniques can be used to determine distance between the devices when the angle of the path connecting the devices is known. For example, time-of-flight or pass-loss model of mmWave propagation can be used.

In practice, however, the beamforming angle in the pair of beam values with the highest value of energy does not correspond to the direction of the shortest path connecting two devices. This is because, the channel estimation is performed with a resolution that can be sufficient for the purposes of mmWave communication, but may be insufficient, i.e., too low, for detecting the dominant path connecting two devices and/or for the accurate localization.

For example, let say that the direction of the path connecting two devices is 37 degrees in some coordinate system and the resolution of the beamforming is 5 degrees. Such a resolution defines a separation between neighboring beamforming angles used for channel estimation. To that end, in this example, during the channel estimation, the beams are steered over the beamforming angles that are multiple of 5 degrees. Thus, in this example, the channel estimation is likely to determine that the beamforming angle of 35 degrees corresponds to the beam with the highest value of energy, because the angle of 35 degrees is closest to the angle of the path connecting the two devices.

In our example, if beam of mmWave is a narrow ray of radiation, such a beam transmitted from one device would not reach the second device at all. However, the beams of mmWaves are spread in angular domain according to a specific power profile. To that end, such a beam transmitted from one device over the angle of 35 degrees can reach another device located over the angle of 37 degrees with relatively high energy that can be sufficient for data communication. That is one of the reasons why a number of mmWaves communication systems do no use high-resolution channel estimation.

However, even if the direction of the path connecting two devices is determined incorrectly, the energy of the beam transmitted over the path deviating from the dominant path still reaches the receiver over the dominant path due to the beam spreading. The methods for determining the distance between the two devices, such as time-of-flight or pass-loss methods, provide an accurate result only over the dominant path. Thus, the deviation of the beamforming angle from the dominant path results in errors in both direction and distance determinations, and can amount to an error unacceptable for some localization-based applications.

Some embodiments are based on realization that there is a relationship between the energy received over the dominant path from the beam transmitted with the beamforming angle and a deviation of the beamforming angle from the direction of the dominant path. Such a relationship depends on a hardware used for the beam forming and a distance between the two devices, but potentially can be used to estimate the direction of the dominant path. Such a relationship is referred herein as a beamforming model relating a deviation of a beamforming angle from the dominant path with the energy of the beam transmitted with the beamforming angle and received over the dominant path.

However, such a beamforming model is underdetermined and includes ambiguity due to unknown distance between the devices. However, some embodiments are based on realization that multiple beam values determined during channel estimation share the same dominant path. For example, in the abovementioned example, it is likely that the beamforming transmission with beamforming angles of 35 and 40 degrees share the same dominant path of 37 degrees. Thus, some embodiments use these multiple beam values to resolve the ambiguity of the beamforming model and to determine the direction of the dominant path.

Figure 7:
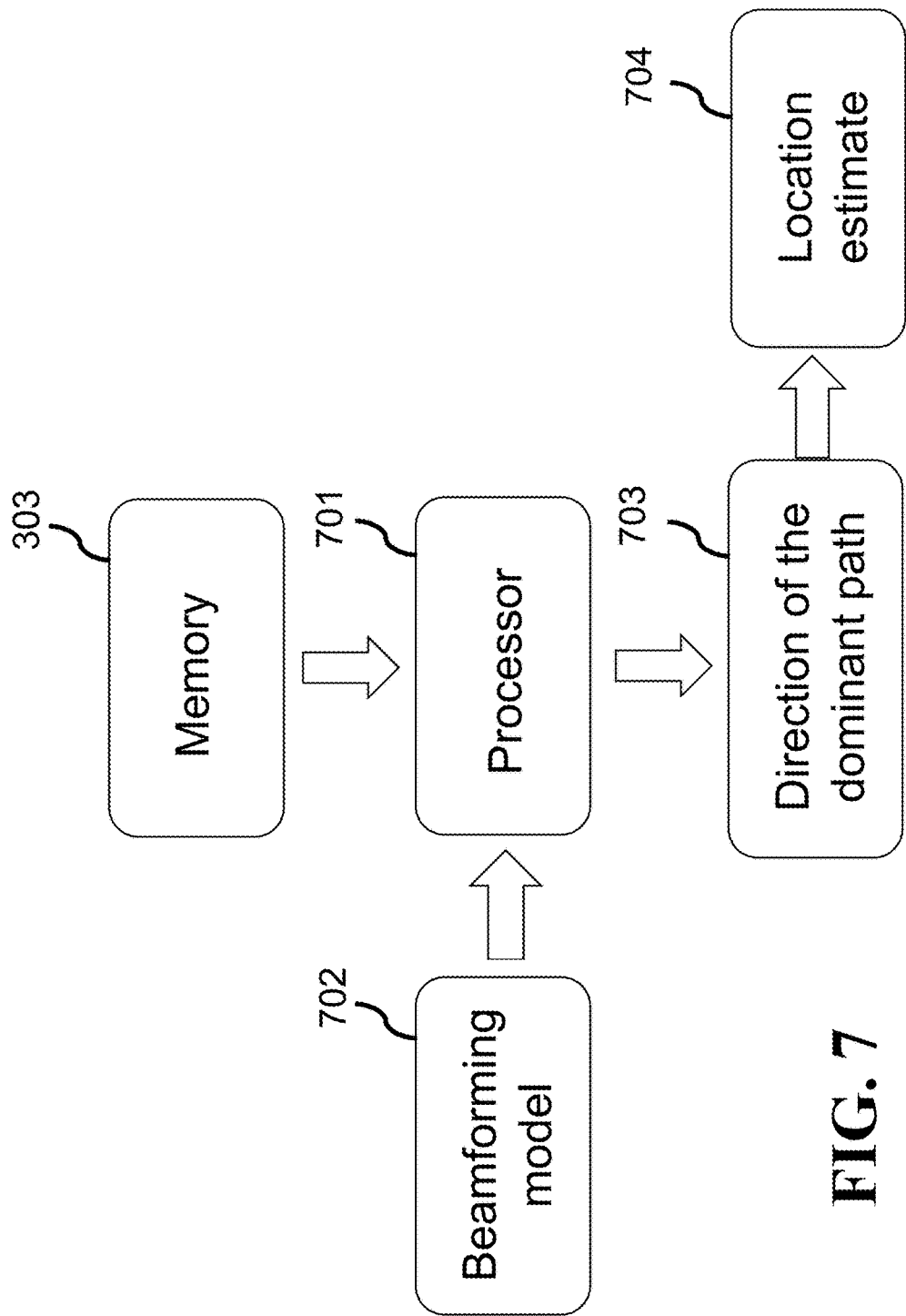
FIG. 7 shows a block diagram of a localization used by some embodiments.

FIG. 7 shows a block diagram of a localization used by some embodiments. The processor 701 retrieves the beam training measurements from the memory 303 and applies beamforming model 702 to estimate the direction 703 of the dominant path between two devices and render the location estimate 704.

In various embodiments, the processor 701 determines a direction of the dominant path by evaluating a beamforming model 702 for the selected pairs of beam values. The beamforming model relates a deviation of a beamforming angle from the dominant path with the energy of the beam transmitted with the beamforming angle and received over the dominant path. As discussed above, the beamforming model is ambiguous, but the multiple pairs of beam values resolve this ambiguity allowing the localization method of some embodiments to take advantage from the knowledge of the direction of the dominant path.

After the direction of the dominant path is determined, the processor 701 determines the location of the first device arranged along the direction of the dominant path with respect to the location of the second device using at least some of the results of the channels estimation. For example, the processor can use model of beam propagation applied to the beams during the channel estimation stage to determine the distance between the two devices along the direction of the dominant path.

In some situations, the dominant path is the shortest path connecting two devices. Due to the reflections of the transmitted beams of mmWaves, the mmWave channel is sparse in the number of arrivals of mmWaves impinging upon the receiver array, and can have multiple distinctive dominant paths connecting transmitter and receiver devices. To that end, the dominant path is the shorted path connecting two devices within an angle defined by two or multiple beamforming angles. For example, in indoor environment, the mmWave channel between two devices can have 3-5 dominant paths.

Figure 8:
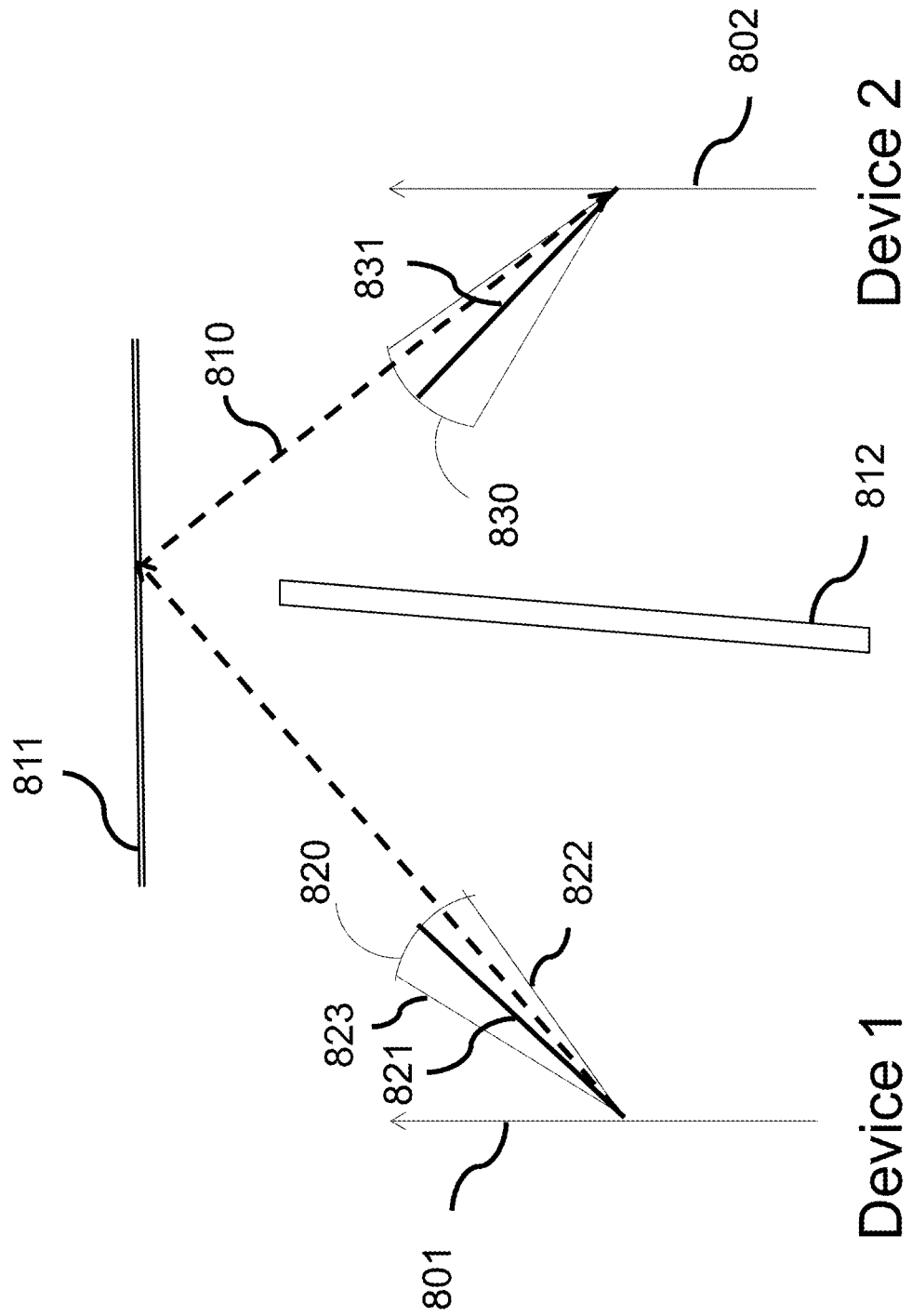
FIG. 8 shows an exemplar schematic illustrating the notion of the dominant path used by some embodiments.

FIG. 8 shows an exemplar schematic illustrating the notion of the dominant path used by some embodiments. In this example, the channel estimation stage indicates that to establish the communication link from Device 1 to Device 2, the Device 1 transmits along beam 820 and the Device 2 receives along beam 830. The distribution of radiated and received signal energy across beams 820 and 830 depends on the type of devices' antennas and is specified by beamforming model. In most cases, the beamforming model indicates that the strongest transmitted signal is in the direction 821 along the center of beam 820. Similarly, the receiver is tuned so that its strongest sensitivity is along the center 831 of beam 830. However, the connection from Device 1 to Device 2 is established along path 810, which is the shortest path bounced off reflector 811 because an obstacle 812 blocks the direct line of sight between the two devices. In this example, the reflected path 810 is referred to as the dominant path between the two devices. In general, the strongest rays in the transmit 820 and receive 830 beams are not aligned with the dominant path because of imperfect beamforming resolution. This misalignment does not impede considerably the communication between the two devices. On the other hand, estimation of the angles associated with the dominant path with respect to the Device 1 and Device 2 is a critical aspect of device localization. This estimation is done in processor 701 using the beam training measurements stored in memory 330 and the beamforming model 702. In such a manner, the embodiments can consider different types of the dominant paths including paths directly and/or indirectly connecting the two devices.

The processor 701 selects multiple beam pairs 601 from memory 303 in order to estimate the direction of the dominant path between two devices using the beamforming model 702. In some implementations, the processor selects the beam pairs 601 that have different beam angles, but share the same dominant path.

Figure 9A:
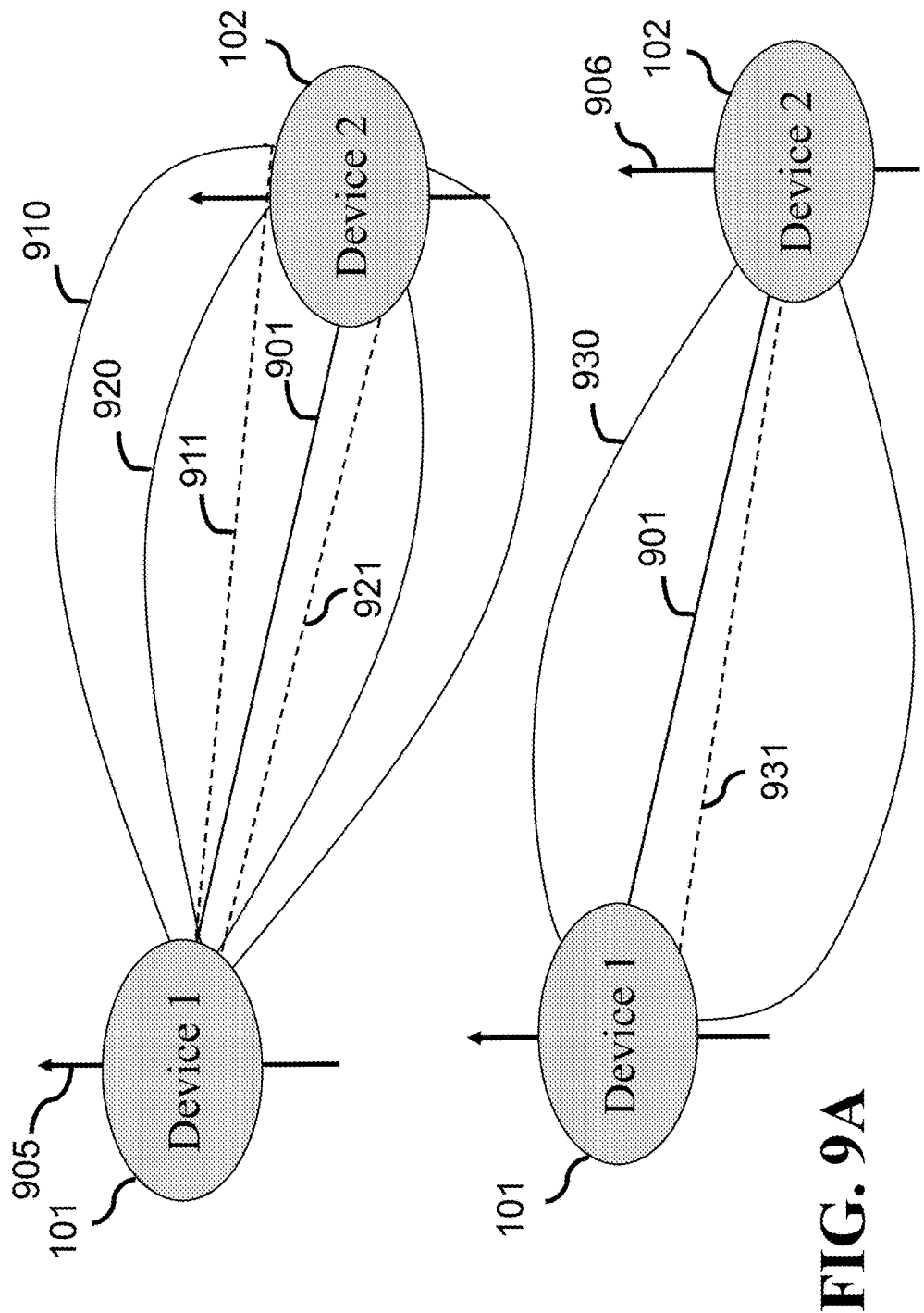
FIGS. 9A and 9B show schematics illustrating examples of multiple beam pairs selected for the estimation of the dominant path direction according to some embodiments.
Figure 9B:
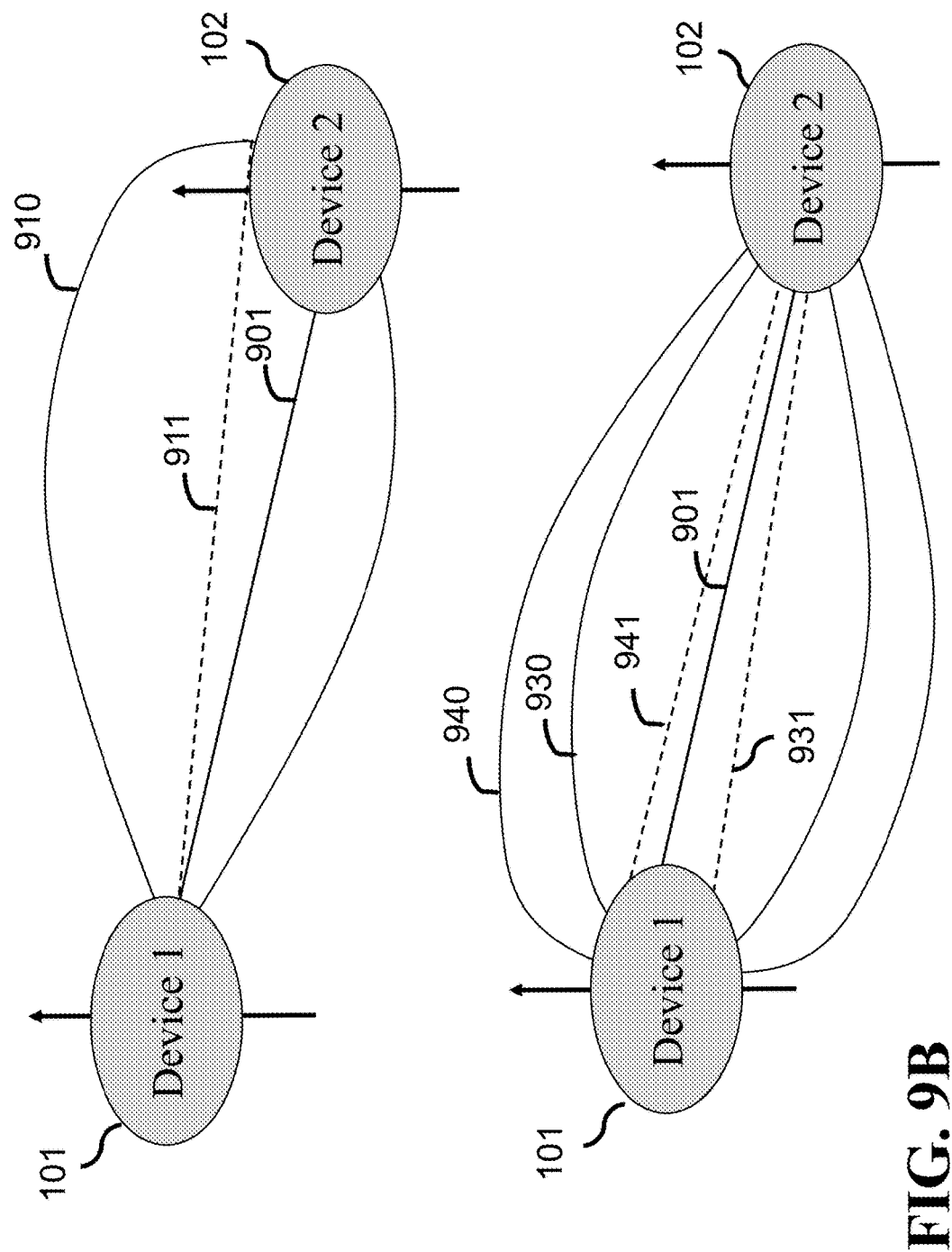

FIGS. 9A and 9B show schematics illustrating examples of multiple beam pairs selected for the estimation of the dominant path direction according to some embodiments. In the example of FIG. 9A, a communication link is established to deliver information from Device 2, 102, to Device 1, 101, based on the beam training measurements in the channel estimation stage. As such, Device 2 transmits information signals along beam 930, while Device 1 receives the information signal by steering beam 910. The shortest path 901 connecting the two devices and within the angles defined by beams 910 and 930 is the dominant path.

Due to an imperfect beamforming resolution the propagation directions of strongest energy along each beam are not aligned with the dominant path. Hence, the dominant path 901 is not aligned with the central directions 911 and 931 of beams 910 and 930, respectively. If the dominant path were perfectly aligned with the center directions of the transmit and receive beams, the center directions would immediately indicate the bearing of each device with respect to the other, in which case, the step of estimating the direction of the dominant path would be completed. However, the perfect alignment can hardly be expected in reality. Therefore, to estimate the direction of the dominant path, the processor 701 in the Device 1 takes into account channel measurements corresponding to not only the beam 910, but also to the beam 920 that shares the same dominant path 901 with the beam 910.

In particular, one pair of the beam values comprises of the angles defining transmit beam 930, receive beam 910, and measurement of the quality of the link established with those transmit and receive beams. The other pair of beam values includes the angles defining transmit beam 930, neighboring receive beam 920, and measurement of the quality of the link established with beams 930 and 920. Note that the dominant path is also not aligned with the center direction 921 of the neighboring receive beam 920.

In general, the receive beam selected for the second pair of beam values is the one neighboring the receive beam chosen to establish the communication link between the two devices. In some implementations, out of two or multiple neighboring beams, the number of which depends on the array shape, the one whose corresponding link quality is largest is selected to aid the estimation of the direction of the dominant path. Notably, if all neighboring beams cover the same range of spatial frequencies, the dominant path lies between the centering directions of the two beams. Referring to FIG. 9A, the dominant path 901 is between the centering directions 911 and 921.

On the other hand, it may happen that the neighboring receive beam 920 covers a wider range of spatial frequencies if a multi-stage beam training is used. Referring to FIGS. 5A and 5B, 528 can be the receive beam selected to establish the communication link. The available beam values, measured during the channel estimation stage corresponding to receive beams 527 and 514. Note that the multi-step beam training avoids measuring quality of the links established with receive beams 525 and 526 because the measurements corresponding to the receive beam 514 indicate that beamforming along directions within the range of 514 is not viable. Hence, when the beams neighboring 920 cover different range of spatial frequencies, the one yielding better link quality can be chosen.

As indicated in FIG. 9A, the two pairs of beam values include the same transmit beam 930. However, other arrangements are possible. For example, as shown in FIG. 9B, one pair of beam values can contain a transmit beam 930, a receive beam 910 and the corresponding link quality measurement, while the other pair of beam values can contain the neighboring a transmit beam 940, the receive beam 910, with the corresponding link measurement. Notably, as illustrated in FIG. 9B, the direction of the dominant path 901 is in the range of angles defined by the center directions 931 and 941. As already discussed, that is the case when beams 930 and 940 cover the same range of spatial frequencies.

Figure 10:
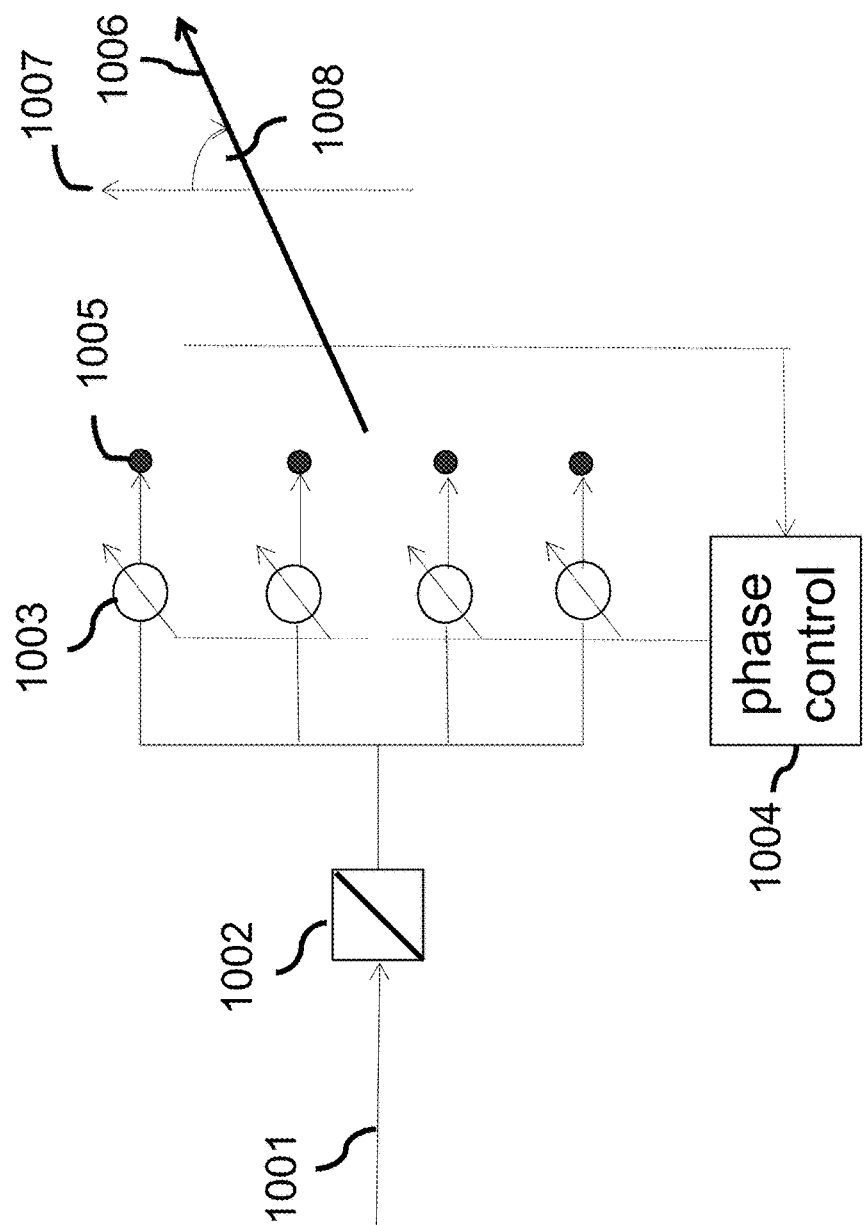
FIG. 10 shows a schematic of a beamforming using a phase array according to some embodiments.

FIG. 10 shows a schematic of a beamforming using a phase array according to some embodiments. In some embodiments, a phased array transmits/receives a signal to/from a particular direction by phase shifting the signals in antenna elements with appropriately computed phase shifts. Each steering direction is associated with a set of phase shifts. The mapping from the phase shifts to steering direction depends on the number of antenna elements, their geometry, separation between them and the signal wavelength. In the following, we assume the transmission mode and point out that the equivalent discussion applies for the reception mode as well.

Referring to FIG. 10, the incoming, information-bearing signal 1001 passes through splitter 1002 whose number of outputs is equal to the number of antenna elements. The signals from the splitter are phase shifted 1003 and radiated by antenna elements 1005. The amount of phase shift applied in each phase shifter is computed in phase control unit 1004 based on the desired steering direction 1006. The steering direction is defined here with respect to vertical line pointing upwards 1007. The steering direction encloses angle 1008 with the reference direction 1007.

As an example, a vertical line phased array as in FIG. 10, includes N antenna elements, equally spaced at $d=\lambda/2$, where $\lambda=c/f$ is the wavelength, given as the ratio between the wave speed c and carrier frequency f. If an antenna element n=1, ..., N transmits a complex exponential signal $\exp(j2\pi\lambda d(n-1\cos\theta))$, where $j=\sqrt{-1}$ is the imaginary unit, then at the distance from the array at about: 10Nd, the electromagnetic field radiated by the antenna array is a plane wave propagating in direction 1006 specified by the angle $\theta$ 1008, where the direction 1006 is defined with respect to the vertical line pointing upwards 1007. Therefore, plane wave model is given by $$a. \quad v(\theta) = [1 \ e^{j\pi\cos\theta} \ \ldots \ e^{j\pi(N-1)\cos\theta}]^T \qquad (1)$$

where T denotes the transpose operator. We emphasize that $v(\theta)$ is a plane wave model for vertical line phased array. The arguments of the complex exponentials in $v(\theta)$ determine the phase shifts that need to be applied to the incoming signal 1001 so that it is steered in the direction of θ.

Although the signal is steered or beamformed in a certain direction, it does not mean that the whole signal energy propagates in exactly that direction. In fact, the signal energy is spatially spread so that non-zero energy can be detected in directions around the desired, steering direction. This is the reason why beams can be referred as a spatial distribution of radiated energy. For a vertical line array, the signal in some direction ψ when the antenna array steers toward some direction θ is given by beamforming model $$S = B(\theta, \psi) = e^{j0.5\pi(N-1)(\cos\theta - \cos\psi)} \frac{\sin(N\pi(\cos\theta - \cos\psi)/2)}{\sin(\pi(\cos\theta - \cos\psi)/2)}. \quad (2)$$

The magnitude of S is called beampattern and indicates how much energy the array radiates in each direction.

Figure 11:
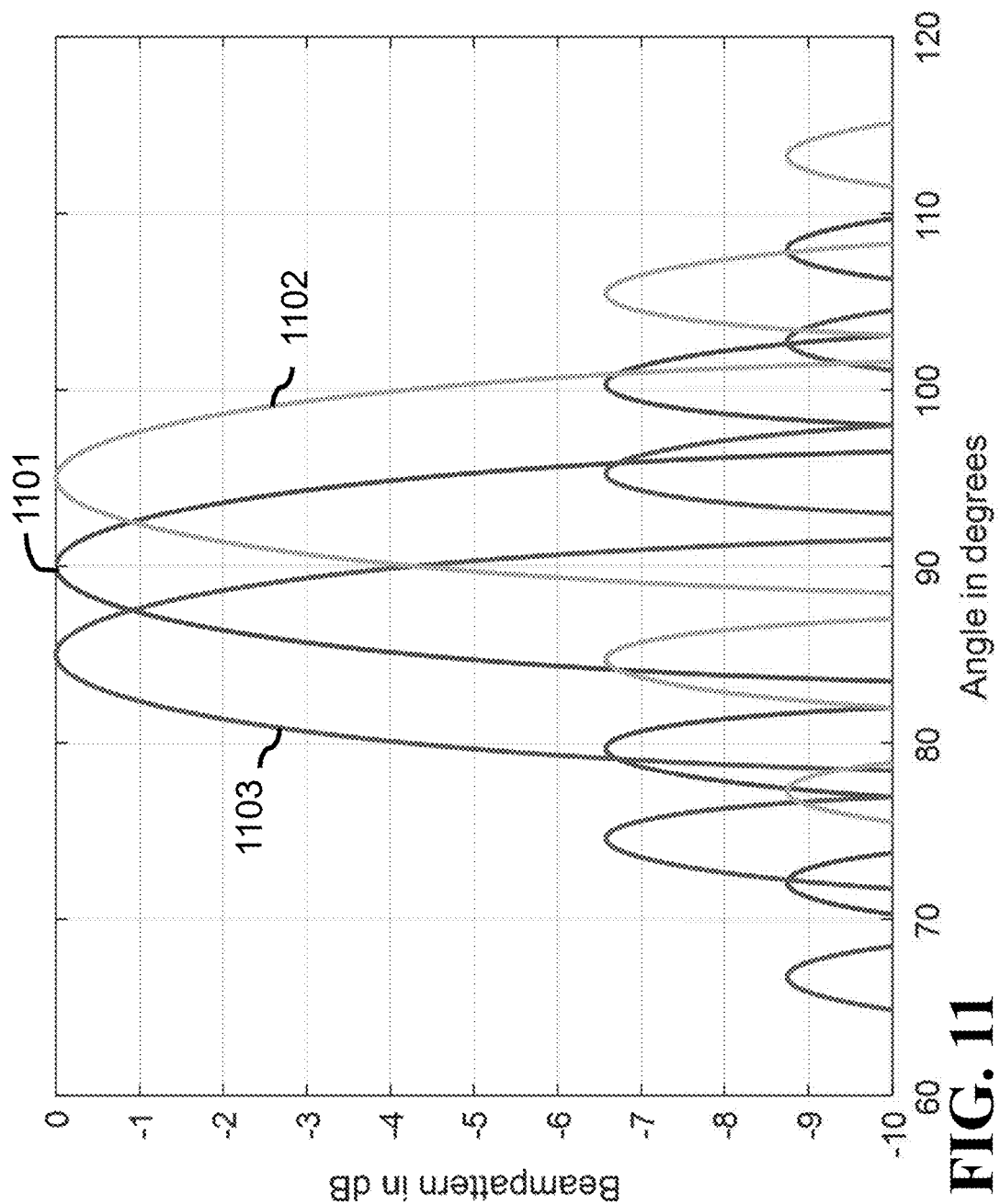
FIG. 11 shows a plot of a beampattern computed by some embodiments.

FIG. 11 shows a plot of a beampattern computed by some embodiments. In this example, the beampattern is computed as $20 \log_{10}|S|$ in dB versus direction. As such, 1101 illustrates how the transmitted signal power depends on direction when the antenna array is steered toward 90°. Notably, there is a considerable amount of power in directions around 90°. Furthermore, a relatively small power is also found in the directions away from 90°.

The beamforming model (2) is derived under the assumption that the signals in antenna elements have the same, unit magnitude. In other words, the beamformer applies uniform weights across signals in antenna elements. There are a number of other windowing functions used by different embodiments that weight signals across antenna elements with the goal to adjust the beampattern such that it may have small amount of radiated energy away from the steering direction or a wider range of angles around the steering direction with considerable amount of radiated energy.

The beamforming can be implemented in digital or analog domain. The majority of systems nowadays implement digital beamforming, where the phase shifts are implemented digitally. One of the advantages of digital beamforming is greater flexibility of phase shift values that can be applied. Technically, the signal can be steered in any direction up to machine precision of the phase shift implemented in the digital beamformer. In addition, a great variety of windowing functions which apply different weights on different antenna signals can also be implemented, yielding various beampatterns.

The digital beamforming requires a radio frequency (RF) chain in each antenna. That is, the received signal in each antenna requires analog-to-digital conversion (ADC) before further processing. Similarly, the transmitted signal in each antenna requires digital-to-analog conversion (DAC) before transmission, which can be disadvantageous in some applications. While multi-antenna communication systems operating in the frequency range below 6 GHz implement one RF chain in each antenna, this is not the case in mmWave transceivers due to hardware related issues. Namely, in addition to being expensive, the ADC's and DAC's operating in mmWave frequencies on multi-GHz range signals consume considerable amount of power. Thus, given that the mmWave transceivers implement long antenna arrays needed to overcome wave attenuation at mmWave frequencies and thus establish communication link via beamforming, implementing one RF chain in each antenna would lead to large cost and consumed power. Thus, mmWave transceivers can implement fully or partially analog beamforming. In partially analog beamforming, usually referred to as the hybrid beamforming, at most few RF chains are implemented and each RF chain is associated with all or a subset of antenna elements.

In spite of simpler implementation, one challenge with analog beamforming is a beamforming resolution. Namely, the analog phase shifters in mmWave transceivers have a finite, often limited number of phase shifts they can apply upon the incoming signal. Consequently, the signal can be steered towards only a relatively small number of directions. The current state-of-the-art resolution in the mmWave transceiver design is 5°, meaning that the consecutive beams in the angular domain are spaced by at least 5°. This is illustrated in FIG. 11 where beams 1102 and 1103 are the neighboring beams of the beam 1101. As shown, the steering directions of 1101, 1102 and 1103 are spaced by 5°.

Note that the beamforming resolution issue arises also in the digital beamforming. Namely, even though the digital beamformer can steer beams towards two fairly close directions, for example 90° and 90.01°, due to spatial energy spread and noise, it can be hard to detect which of the two directions the received signal indeed arrives from. In other words, depending on array size and noise level, there is a resolution limit up to which a direction of the received signal can certainly be determined.

One embodiment estimates the direction of the dominant path based on two pairs of beam values. Referring to FIG. 9A, denote with α the angle of the center direction 931 of the beam 930 with respect to the vertical line pointing upwards 906. The angle of the dominant path 901 with respect to 906 is denoted θ. Since the Device 2 transmits pilot signal during the channel estimation stage along the direction 931, the signal transmitted along the dominant path 901 is then given by $$z = B(\alpha, \theta), \quad (3)$$

where B(α,θ) is introduced in (2) and used here to relate the deviation of the beamforming angle α from the direction of the dominant path θ to the signal energy that propagates toward the receiver. Notably, the signal along the dominant path 901 is what matters because that is the signal which reaches the receiver, in our case the Device 1.

Still referring to FIG. 9A, denote with β and γ the angles the centering directions 911 and 921 of the beams 910 and 920, respectively, enclose with the vertical line pointing upwards 905. The angle the dominant path 901 encloses with 905 is denoted with $\theta_1$. Thus, the gain introduced by the Device 1 when steering towards 911 to the pilot signal propagating along the dominant path 905 is given by $$g_1 = B(\theta_1, \beta) \quad (4)$$

Similarly, this gain when the Device 1 steers towards 921 is given by $$g_2 = B(\theta_1, \gamma) \quad (5)$$

The beamforming model is used here to relate the deviation of the beamforming angles β and γ applied on the receiver side from the angle of the dominant path $\theta_1$ to the received signal energy.

Assuming the Device 1 records magnitudes of the received signals to account for the link quality measured during the channel estimation stage, the received signal magnitude when steering towards 911 is given by $$z_1 = |kzg_1 + n_1| = |kB(\alpha,\theta)B(\theta_1,\beta) + n_1|, \quad (6)$$

where k accounts for the transmitted signal power and propagation attenuation, and $n_1$ is the resulting noise after beamforming. Similarly, when steering towards 921, the magnitude of the received pilot signal is given by $$z_2 = |kzg_2 + n_2| = |kB(\alpha,\theta)B(\theta_1,\gamma) + n_2|, \quad (7)$$

where $n_2$ is the resulting noise after beamforming. We note that the impact of the distance between the two devices is embedded in the scaling factor k.

In various embodiments, the angles $\alpha$, $\beta$ and $\gamma$ as well as the measurements $z_1$ and $z_2$ are known and come from the two pairs of beam values. On the other hand, the angles $\theta$ and $\theta_1$ and k are unknown. Taking the ratio between (6) and (7) and neglecting the noise yields $$\frac{z_1}{z_2} = \frac{|B(\theta_1, \beta)|}{|B(\theta_1, \gamma)|} \quad (8)$$

In the case of vertical line arrays, this ratio is using (2) given by $$\frac{z_1}{z_2} = \left| \frac{\sin(N\pi(\cos\theta_1 - \cos\beta)/2)\sin(\pi(\cos\theta_1 - \cos\gamma)/2)}{\sin(N\pi(\cos\theta_1 - \cos\gamma)/2)\sin(\pi(\cos\theta_1 - \cos\beta)/2)} \right| \quad (9)$$

Hence, the direction of the dominant path, given as the angle $\theta_1$ it encloses with the reference 905 is obtained by solving non-linear equation (9). Since the direction of the dominant path 901 is between 911 and 921, we may perform a greedy search for $\theta_1$ in the range of angles from min($\beta,\gamma$) to max($\beta,\gamma$). The final result of this processing step is the estimate of the dominant path direction $\theta_1$.

Some embodiments are based on realization that there is an ambiguity about the direction of the dominant path in the results from the channel estimation stage. In the absence of any insights, one may estimate that the dominant path has direction given by $\beta$, which is the steering direction the Device 1 should apply in order to establish the communication link with the Device 2. That would lead to large localization error. The described method overcomes this problem by properly applying the beamforming model. In essence, the beamforming model help us resolve the ambiguity in the direction of the dominant path.

In one implementation, the characterization of the dominant path direction (9) is obtained by neglecting the impact of noise realizations $n_1$ and $n_2$ on the ratio $z_1/z_2$. This assumption can be justified in the case of large beamforming gain yielding large SNR so that the noise terms are small relative to the corresponding signal terms. Notably, the mmWave communication systems indeed rely on large beamforming gain as a mean to alleviate large attenuation of the mmWaves and thereby close the link. However, in case of non-negligible noise, more than two pairs of beam values are needed and used in a similar vein, as is described later.

The above example use a vertical line phased array. However, the same reasoning applies for other array geometries. Also, the same approach can be used to determine the dominant path direction $\theta$ from the pairs of beam values comprising of receive beam 910 and transmit beams 930 and 940, depicted in FIG. 9B.

Figure 12:
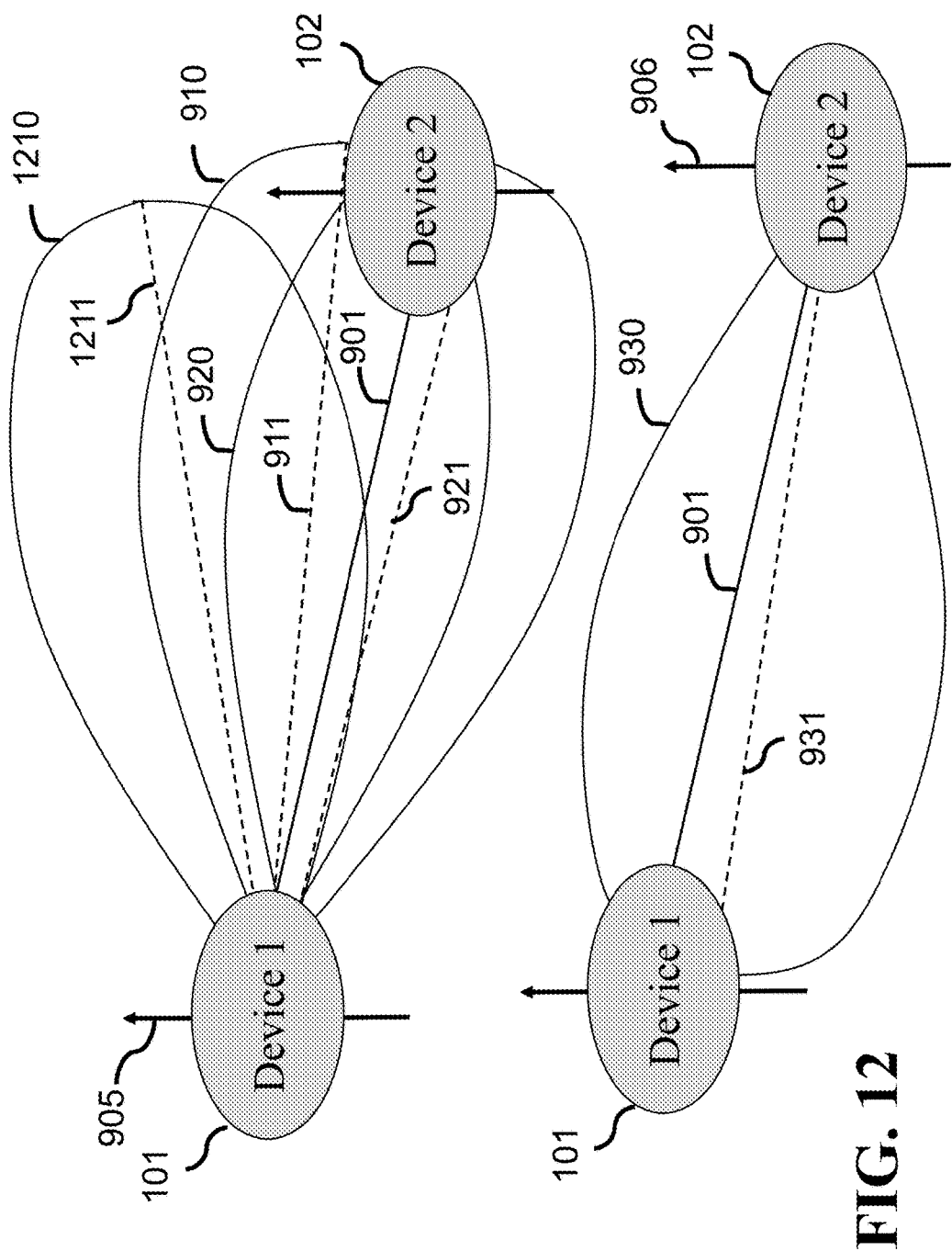
FIG. 12 shows a schematic of an example of using more than two pairs of beam values to estimate the direction of the dominant path between two devices according to one embodiment.

FIG. 12 shows a schematic of an example of using more than two pairs of beam values to estimate the direction of the dominant path between two devices according to one embodiment. Referring to FIG. 12, the channel estimation stage results in instructing the Device 2 to transmit information by steering the signal in the direction 931 and the Device 1 to receive the signal by steering towards direction 911. This leads to transmit beam 930 and receive beam 910. To estimate the direction of the dominant path 901, expressed with the angle it encloses with the reference direction 905, the processor 701 selects from the memory 303 three pairs of beam values. Those pairs are (($\alpha,\beta$),$z_1$), (($\alpha,\gamma$),$z_2$) and (($\alpha,\delta$),$z_3$), where $\alpha$ is the angle the transmit steering direction 931 encloses with the reference direction 906, $\beta$ is the angle the receive steering direction 911 encloses with the reference direction 905, $\gamma$ and $\delta$ are the angles the center directions 921 and 1211 of the neighboring beams 920 and 1210 enclose with the reference direction 905, and finally, $z_1$, $z_2$ and $z_3$ are the corresponding received signal magnitudes.

Similar to (6) and (7), the measurement $z_3$ is given by $$z_3 = |kzg_3 + n_3| = |kB(\alpha,\theta)B(\theta_1,\delta) + n_3|, \quad (10)$$

where $n_3$ is the measurement noise.

As before, the ratio between any two pairs of measurements $z_1$, $z_2$ and $z_3$ are taken as statistics to estimate the dominant path direction. As such, $$t_1 = \frac{z_1}{z_2} \approx \left| \frac{\sin(N\pi(\cos\theta_1 - \cos\beta)/2)\sin(\pi(\cos\theta_1 - \cos\gamma)/2)}{\sin(N\pi(\cos\theta_1 - \cos\gamma)/2)\sin(\pi(\cos\theta_1 - \cos\beta)/2)} + w_1 \right|, \quad (11)$$

where $w_1$ summarizes the noise and approximation error. Similarly, $$t_2 = \frac{z_1}{z_3} \approx \left| \frac{\sin(N\pi(\cos\theta_1 - \cos\beta)/2)\sin(\pi(\cos\theta_1 - \cos\delta)/2)}{\sin(N\pi(\cos\theta_1 - \cos\delta)/2)\sin(\pi(\cos\theta_1 - \cos\beta)/2)} + w_2 \right|, \quad (12)$$

where $w_2$ summarizes the noise and approximation error. The angle $\theta_1$ of the dominant path direction can be estimated from the statistics $t_1$ and $t_2$ using, for example, a least squares fit.

Additionally, or alternatively, the Device 1 can utilize more than three beam pairs for the sake of obtaining an accurate estimate of the dominant path direction. Also, the beam pairs can share the same receive beam direction and use different transmit beams. Furthermore, different combinations of the receive and transmit beams in the pairs of beam values are also possible. For example, two beam pairs can share the same transmit beam and contain different receive beams and other two beam pairs can share the same receive beam and contain different transmit beams. The model for the measured signal magnitudes in all four beam pairs depends on the unknown dominant path direction and known steering directions of all those beams.

The direction of the dominant path between two devices yields the direction of one device, such as Device 1, with respect to the other device, such as Device 2. As shown in FIG. 1, this means that one can directly determine the angle 108 from the dominant path direction. However, to localize the Device 1 with respect to the Device 2, the distance between two devices r 107 needs to be estimated.

Figure 13A:
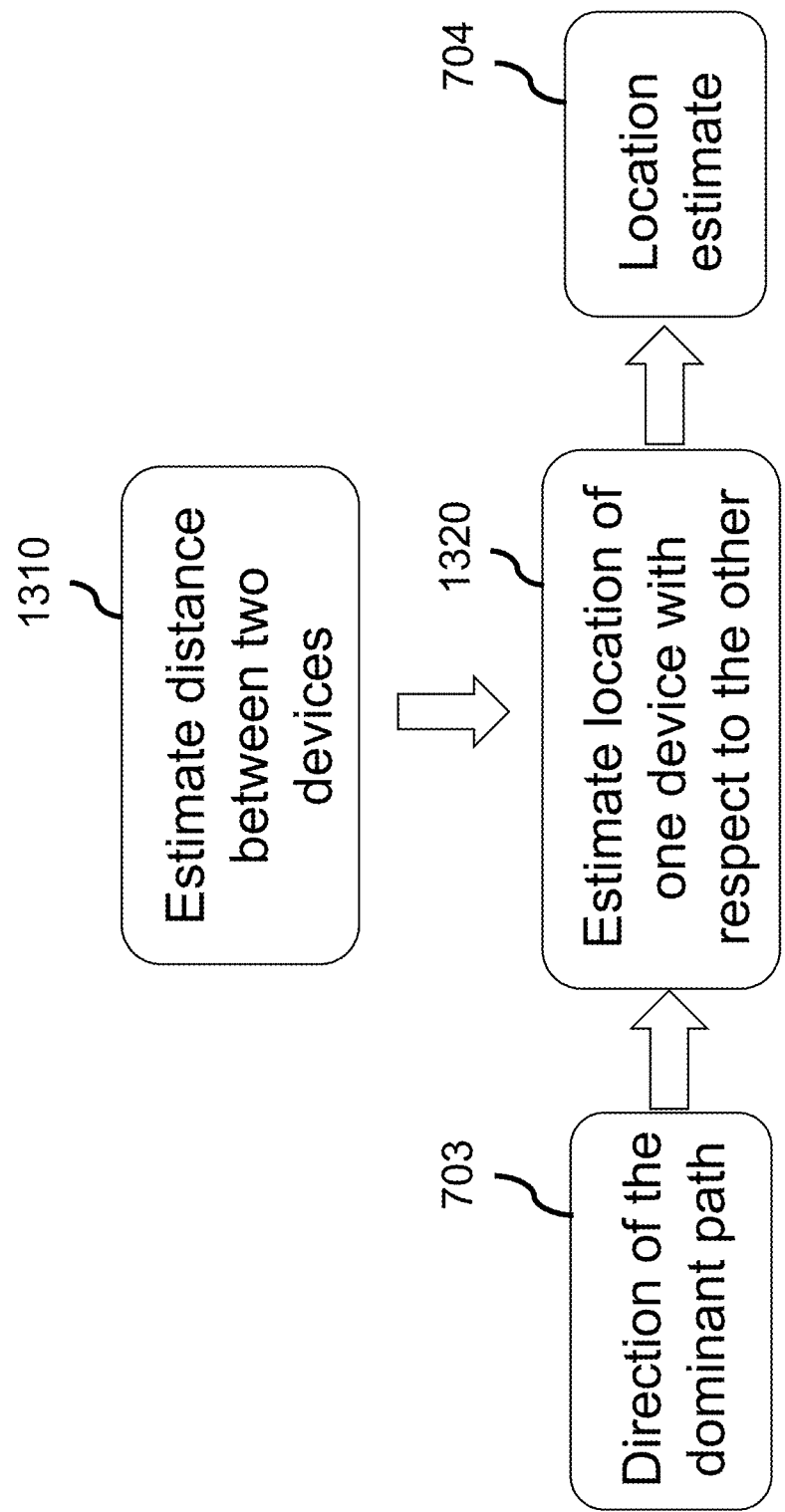
FIG. 13A shows a block diagram of a method for estimating the location of the device according to one embodiment.

FIG. 13A shows a block diagram of a method for estimating the location of the device according to one embodiment. Specifically, the embodiment localizes 1320 one device with respect to the other device along the estimated direction of the dominant path 703. In other words, the embodiment estimates 1310 the distance between two devices along the direction 703 of the dominant path to produce the location estimate 704. Different embodiments use different methods to determine the distance between devices along the direction of the dominant path.

Figure 13B:
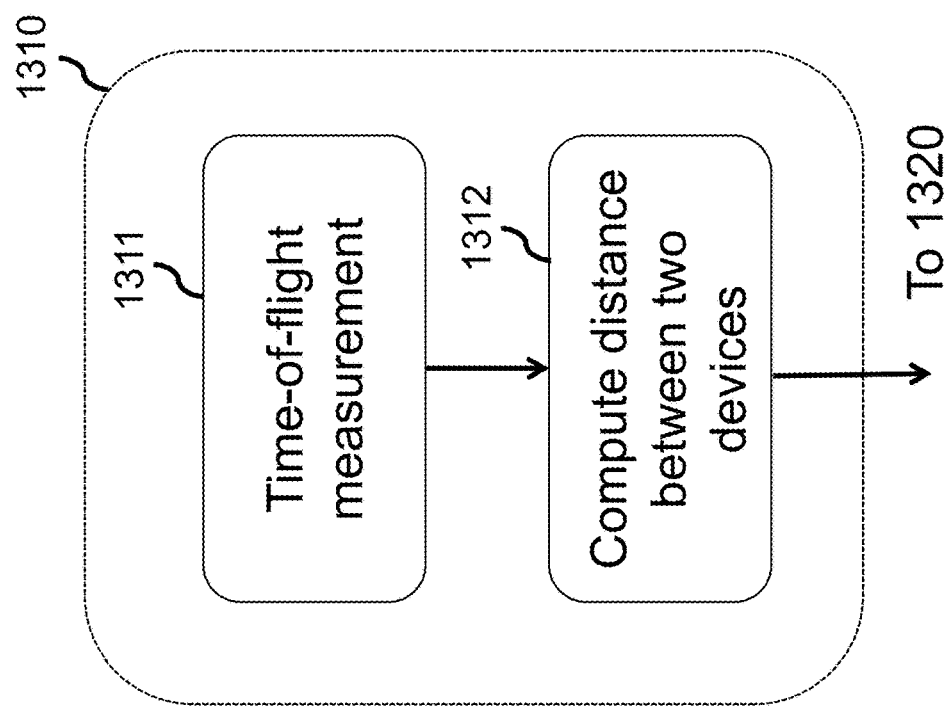
FIG. 13B shows a block diagram of a method for determining the distance between the two devices using the time-of-flight (TOF) measurement in accordance with some embodiments.

FIG. 13B shows a block diagram of a method for determining the distance between the two devices using the time-of-flight (TOF) measurement in accordance with some embodiments. The TOF is the time interval the signal takes to propagate from one to the other device. Denoting the TOF measurement 1311 with τ, the distance between two devices is computed 1312 as $$d = \tau c \tag{13}$$

where c is the speed of wave propagation through the environment, which is in our case the speed of light in the air. The computed distance d is then used for device localization 1320. The TOF measurement can be obtained in multiple ways.

Figure 13C:
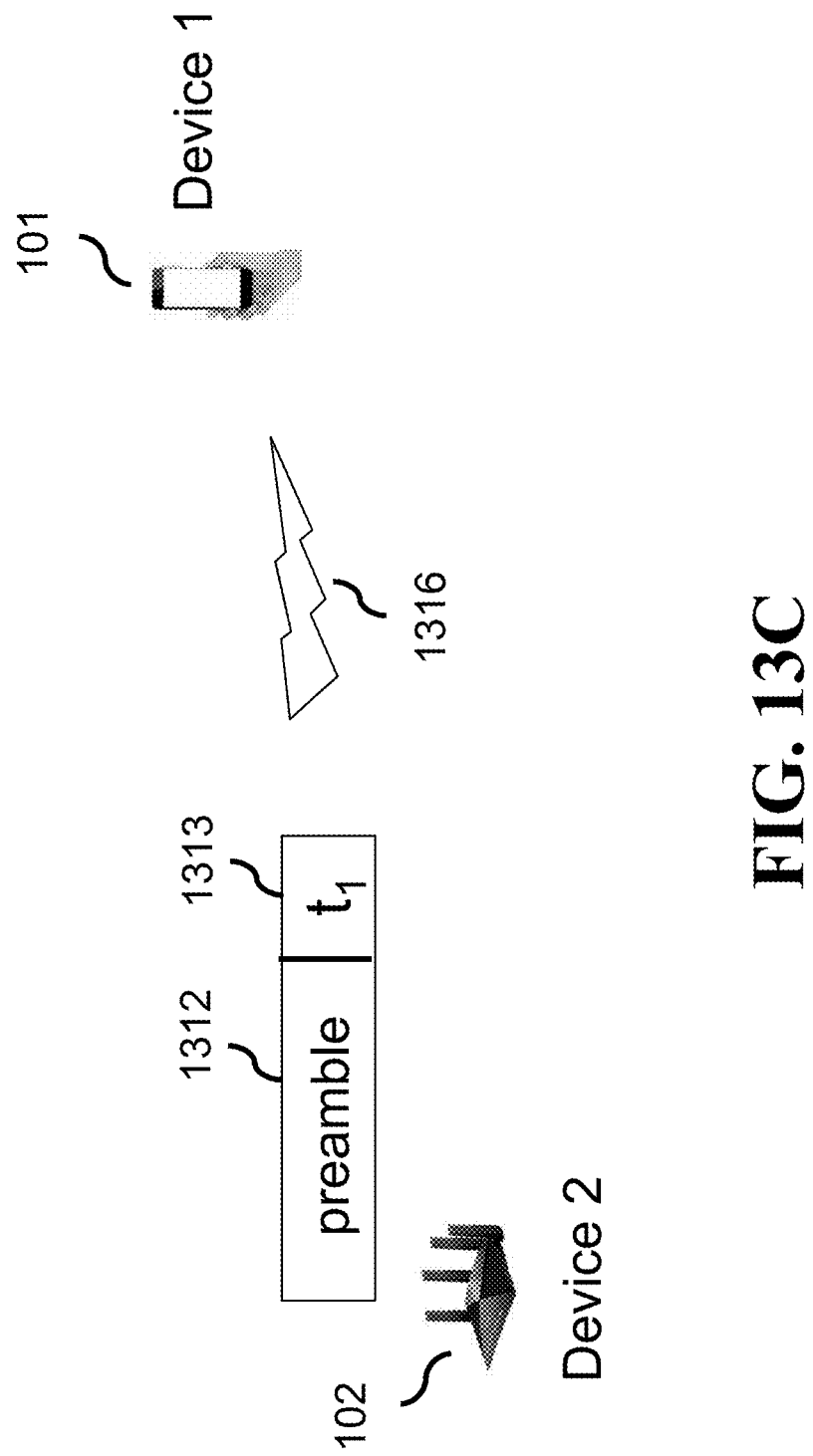
FIG. 13C shows a schematic of a method for determining the TOF measurements according to some embodiments that use TOF chip.

FIG. 13C shows a schematic of a method for determining the TOF measurements according to some embodiments that use TOF chip. For example, one embodiment implements the method of FIG. 13C using commercially available TOF chips embedded in one or both devices. Additionally, or alternatively, another embodiment uses the communication standard implemented by the devices to measure the TOF of a signal between the two devices. For example, the TOF can be measured by sending a pilot signal 1316 from one device 102 to the other device 101. The pilot signal carries a packet including a preamble 1312 and one field 1313 specifying the time instant $t_1$ of the transmission. The other device receives the transmitted signal, detects the preamble and records the time instant of the reception $t_2$. Assuming the two devices are synchronized, the TOF is given by $\tau = t_2 - t_1$. The synchronization can be achieved during the channel estimation stage. Alternatively, the TOF can be measured from the round-trip-time (RTT) a device measures from transmitting a signal to receiving an acknowledgement message from the other device. The TOF is then given as the half of the RTT.

Figure 14A:
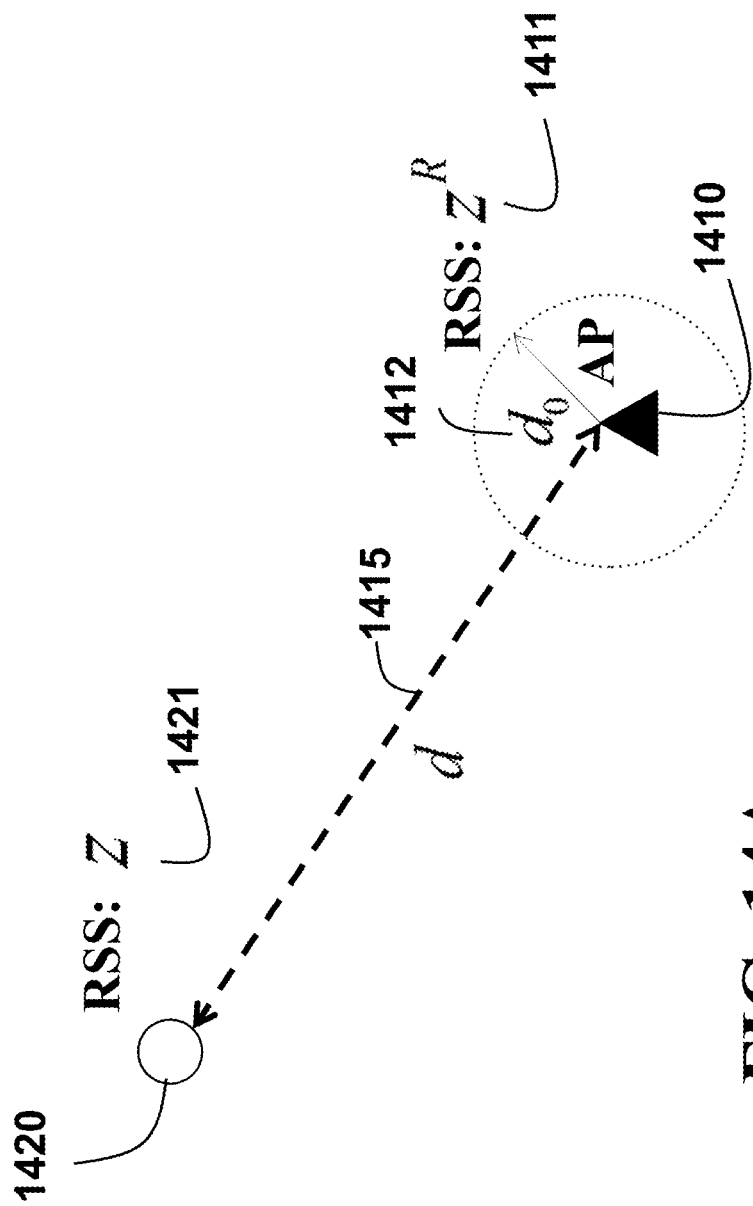
FIG. 14A shows a schematic of a method implemented by another embodiment to determine the distance between the two devices using a path loss model.

FIG. 14A shows a schematic of a method implemented by another embodiment to determine the distance between the two devices using a path loss model. The path loss model describes how the power of the propagating signal decreases with distance due to spreading and attenuation. An access point (AP) 1410 is characterized with reference received signal strength (RSS) level $z^R$ 1411 at reference distance $d_0$ 1412. The AP's reference RSS level $z^R$ is predetermined.

The level of the signal received by a device 1420 originating from the AP is denoted with z 1421. A path loss model describes the relation between RSS measurement z and the distance d 1415 between the AP and device $$z = z^R - 10\eta \log_{10}\frac{d}{d_0} + v, \tag{14}$$

where η is path loss coefficient and v is measurement noise. The path loss coefficient quantifies how quickly the radiated signal power decays as the distance from the access point increases. In free space propagation environment, η=2. It has higher values in more complicated settings such as indoor areas.

For Gaussian distributed measurement noise v, the maximum likelihood (ML) estimate of the distance d is given by $$\hat{d} = d_0 10^{(z^R - z)/10\eta} \tag{15}$$

The Gaussian noise statistics for v is a justified assumption in practice.

In some embodiments, to obtain more accurate distance estimate, the propagation loss due to attenuation should be accounted in the path loss model. Denoting with α the attenuation loss per unit distance, the RSS z is given by $$z = z^R - 10\eta\log_{10}\frac{d}{d_0} - \alpha d + v, \tag{16}$$

Then the ML estimate for the distance d is given by $$d = \arg\min_d \left| z - z^R + 10\eta\log_{10}\frac{d}{d_0} - \alpha d \right|, \tag{17}$$

which is solved using a non-linear optimization routine.

The path loss coefficient η and attenuation α are, in general, not known. However, numerous experimental measurements involving mmWave propagation report those coefficients in different environments. Consequently, in one embodiment, the distance estimation block performs table lookup to gather those values for the type of environment and then estimates d based on the measured RSS value z.

Figure 14B:
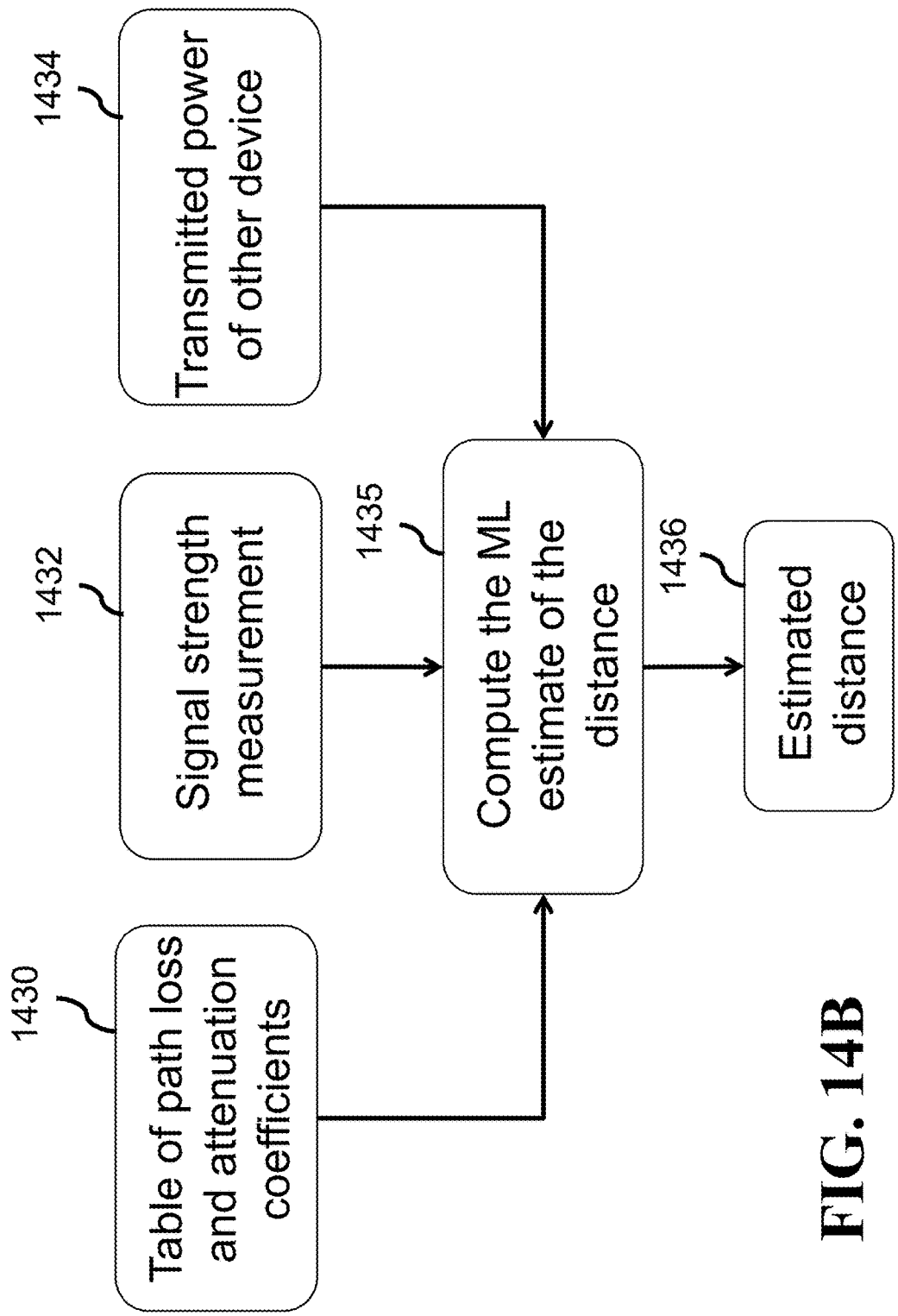
FIG. 14B shows a block diagram of a method for determining the distance between two devices using maximum likelihood according to some embodiments.

FIG. 14B shows a block diagram of a method for determining the distance between two devices using attenuation coefficients according to some embodiments. For example, a processor 1435 implementing the ML estimate according to Equation (17) obtains the path loss and attenuation coefficients from a memory 1430 storing those values for a variety of environments, signal strength measurement 1432, which is actually the beam energy 612, and the transmission power of the other device 1434. The transmit power of the other device is usually obtained during the initial device association stage, which precedes the channel estimation stage. The non-linear optimization routine, implemented in 1435, results in distance estimate 1436.

According to some embodiments, the location of the Device 1 with respect to the Device 2 is determined based on the estimated direction of the dominant path $\hat{\beta}$ and the distance between the two devices $\hat{d}$. In general, the Device 1 is located at distance $\hat{d}$ along the direction determined with $\hat{\beta}$. The embodiments provide accurate localization as long as the devices are in direct line of sight (LOS) between each other. However, for alternative embodiments, the two devices are not in the direct LOS communication.

Figure 15A:
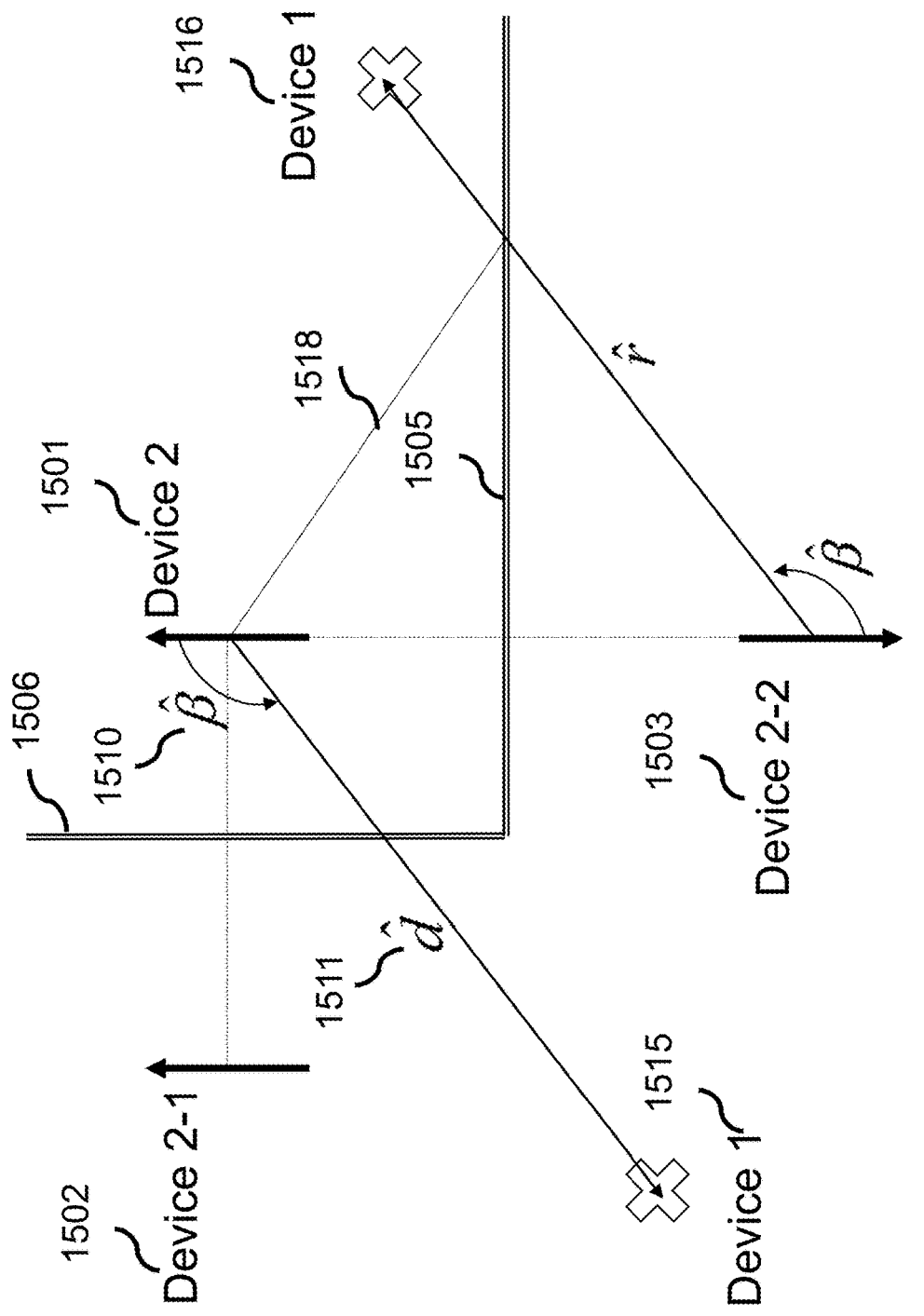
FIG. 15A shows a schematic of an exemplar arrangement of two devices considered by some embodiments.

FIG. 15A shows a schematic of an exemplar arrangement of two devices considered by some embodiments. In one example, the Device 2 is at the location 1501 close to the corner comprising of horizontal 1505 and vertical 1506 rigid walls. Given the estimates of the dominant path direction and distance, one may go along the direction defined by the angle $\hat{\beta}$ 1510 the distance $\hat{d}$ 1511 and estimate the location 1515 for the Device 1. Such a localization implies that the Device 1 is behind rigid walls, which may not be the case for mmWave communication having low ability to propagate through the walls. To that end, some embodiments use a floor map of the area to correct an estimated location of a device. These embodiments allow to determine the location of a device with respect to another device in presence of direct and/or indirect (reflected) communication link between the devices.

In this example of FIG. 15A, given the floor map of the area, the embodiment concludes that the Device 1 cannot be located at 1515 as the received mmWave signal strength would be so small that the two devices would probably never get associated. Given the map, the embodiment automatically computes virtual locations of the Devices 2. Those are mirrored versions of the Device 2, located at 1502 and 1503, with respect to the rigid walls 1506 and 1505, respectively. Thus, if the link between the two devices is established along the reflected path 1518, it is equivalent to having a virtual Device 2-2 at location 1503 that is in communication with the Device 1. Similarly, if the link between Device 1 and Device 2 is along the path that reflects off from wall 1506, it is equivalent to having a virtual Device 2-1 at 1502 that is in communication with the Device 1.

Figure 15B:
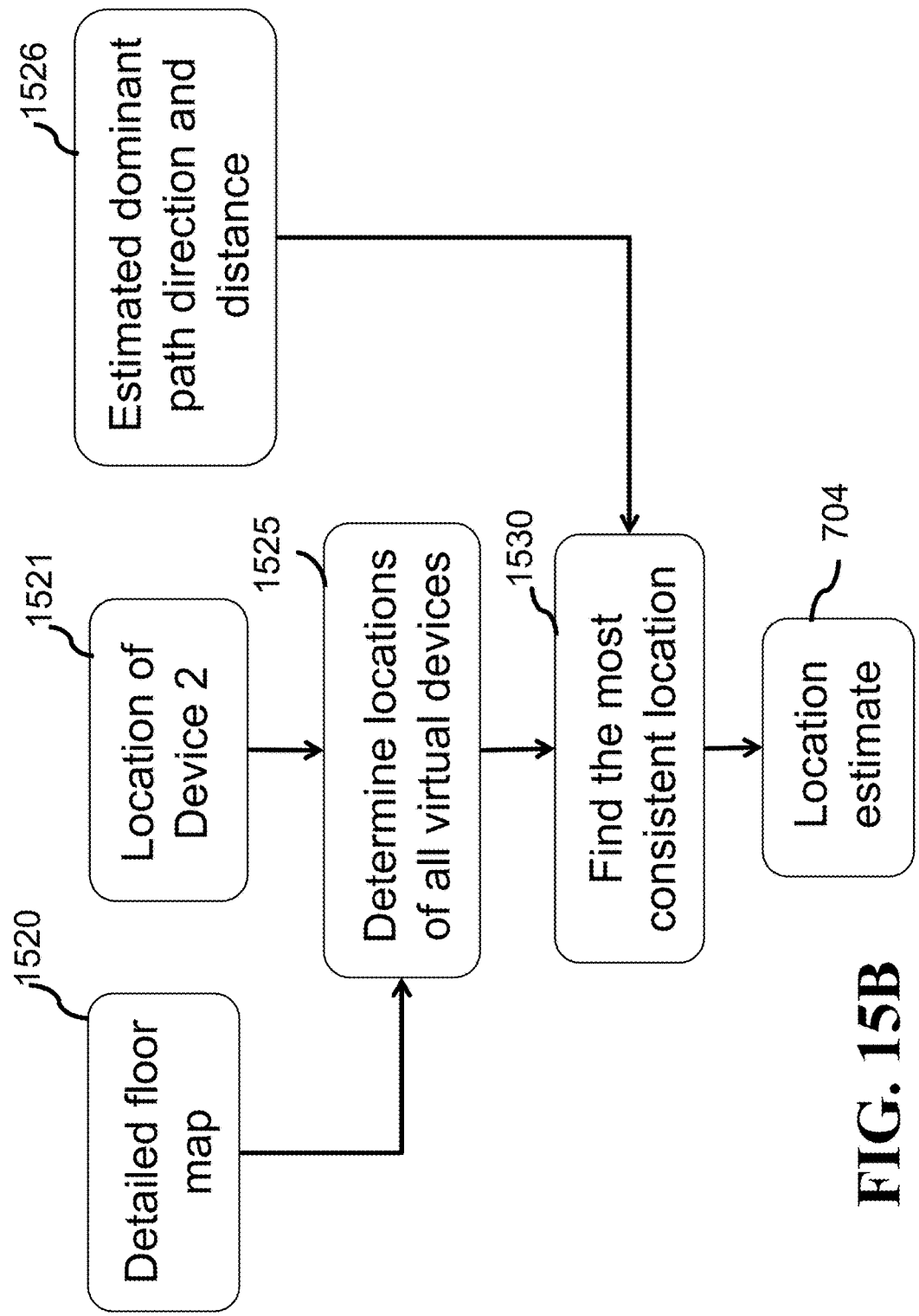
FIG. 15B shows a block diagram of indoor localization using a map of environment surrounding the first and the second devices according to one embodiment.

FIG. 15B shows a block diagram of indoor localization using a map of environment surrounding the first and the second devices according to one embodiment. According to this embodiment, once a device performing localization of the Device 1 with respect to the Device 2 is supplied with the map 1520, the embodiment automatically computes the locations of all virtual devices arising from the Device 2 1525, based on the known location of the Device 2 1521. Then, the embodiment applies the estimated dominant path direction and distance 1526 to each of the actual and virtual devices.

Referring to FIG. 15A, the embodiment computes locations at angle $\hat{\beta}$ and $\hat{d}$ distance a from each of the Device 2, Device 2-1 and Device 2-2 and outputs the location which is the most consistent with the map 1530. In this example, that is location 1516. In a simple case of FIG. 15A, it may happen that more locations are consistent with the map. However, the indoor areas are usually more complicated and taking into account more walls yields a single location estimate. The most consistent location estimate 1530 is the final location estimate 704.

Some embodiments provide alternative implementations of the routine in 1530. Namely, an alternative to directly finding locations at angle $\hat{\beta}$ and distance $\hat{d}$ from the Device 1 and its virtual images, is to divide the indoor area into grids and compute likelihood function for each grid point. To do so, the embodiments specify an error model for the dominant path direction estimation and distance estimation. Assuming the true angle corresponding to the estimate $\hat{\beta}$ is $\beta$, the error can be modeled as being zero-mean Gaussian distributed with variance $\sigma_\beta^2$. Similarly, we can model the error in the distance estimate $\hat{d}$ from the true distance d as being zero-mean Gaussian distributed with variance $\sigma_d^2$. The variances $\sigma_\beta^2$ and $\sigma_d^2$ can be calibrated or assessed based on sensors used. For example, the state of the art mmWave TOF sensors yield distance estimates of standard deviation 15 cm.

Given the error models for dominant path direction and distance estimation, we determine for each grid point the likelihood of being at the angle $\hat{\beta}$ and distance $\hat{d}$ with respect to each of Device 2 and its virtual images. For example, assume a grid point β is at angle α and distance r from the Device 2's virtual image i. The likelihood function is then given by $$l_i(p) = \frac{1}{\sqrt{2\pi\sigma_\beta^2}} e^{\frac{(\hat{\beta}-\alpha)^2}{2\sigma_\beta^2}} \frac{1}{\sqrt{2\pi\sigma_d^2}} e^{\frac{(\hat{d}-r)^2}{2\sigma_d^2}}, \quad (18)$$

where β goes over all grid points and i refers to the reference device or one of its virtual images. The location is then estimated as the location corresponding to the grid point β which yields the largest likelihood function over all i. We note that the Gaussian model of the error made in estimating the direction of the dominant path is fine as long as α and $\hat{\beta}$ are not very different. If, for example, $\hat{\beta}=80°$, α=10° and the number of antennas is, say, 100, the likelihood arising from the discrepancy between α and $\hat{\beta}$ can be accounted from the beampattern magnitude at direction 80° and corresponding to when the beam is steered toward 10° in the direction of 80°, which is fairly close to zero.

After the embodiment determines that the two devices communicate along a reflected path, the embodiment can optionally refine the distance estimate by taking into account the loss in signal energy due to reflection. This is done by subtracting the reflection loss, known from experiments and, e.g., tabulated into a look-up table. To obtain an exceedingly accurate distance estimate, a detailed map including the type of material used for walls is used, as well as the reflection loss incurred by the mmWave.

In some embodiments, the estimation of the dominant path direction is accompanied by not only noise, but also interference coining from, for example, reflections. That is, in addition to noise $n_3$ in (10), there is also a term modeling all interference coining from reflections that are passing through the beamformer. However, since a device is steering close to one dominant path, the signals coining from other directions, i.e., other dominant paths, are fairly attenuated. Thus, the impact of the interference is negligible and does not considerably deteriorate the estimation accuracy.

Figure 15C:
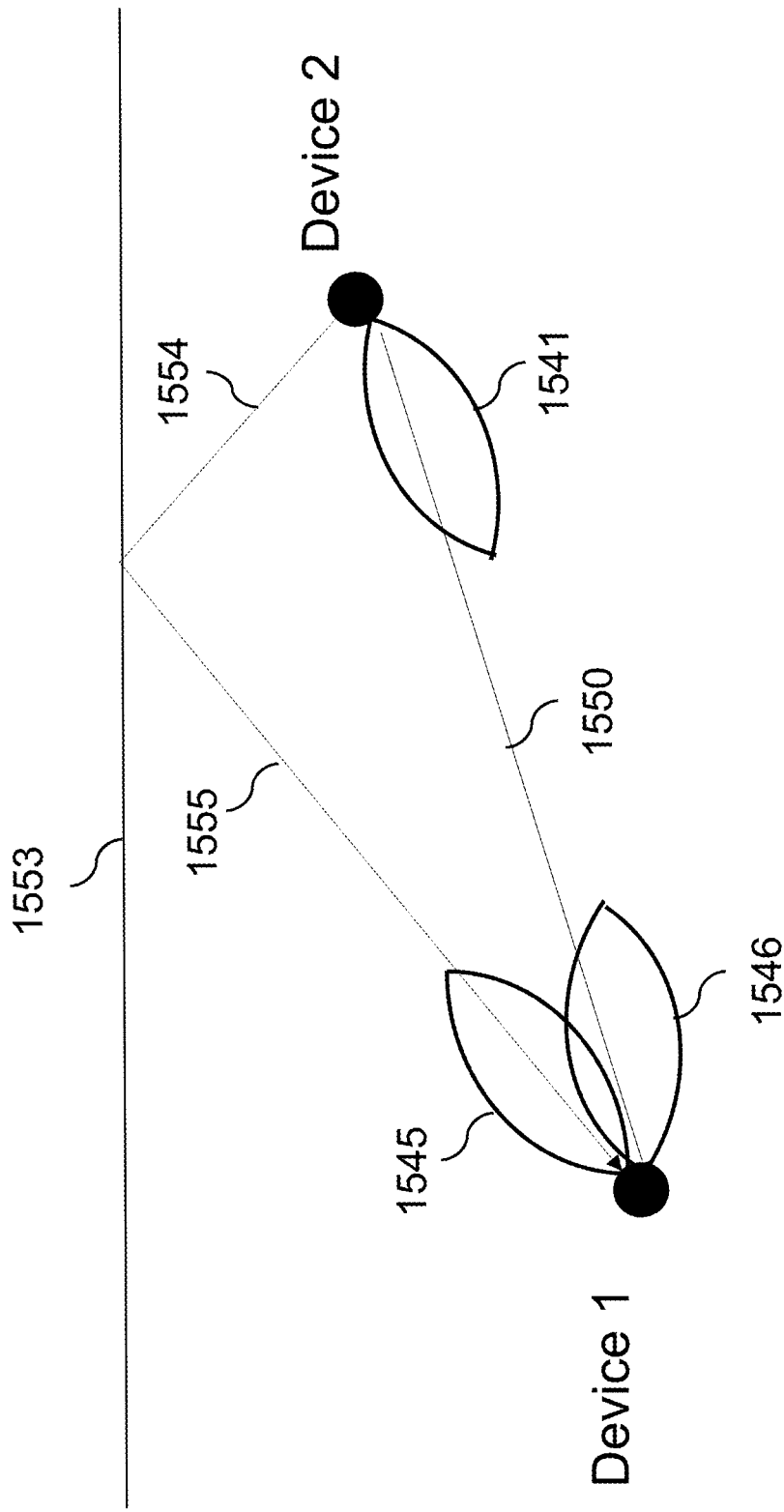
FIG. 15C shows a schematic of exemplar communication between two devices along multiple path used by some embodiments.

FIG. 15C shows a schematic of exemplar communication between two devices along multiple path used by some embodiments, to further elaborate on this aspect. In this example, the devices create, respectively, transmit beam 1541 and receive beam 1546 to establish a communication link along the dominant path 1550. To estimate the direction of the dominant path, the Device 1 uses two pairs of beam values—one with angles defining beams 1541 and 1546, and the other with angles defining beams 1541 and 1545. As shown, there is also a dominant path comprising of 1554 and 1555, that reflects off wall 1553. That means that when the Device 2 sends a signal along the beam 1541, one portion of the transmitted energy propagates along 1554 and 1555 and reaches the receiver. Thus, the received signal strength when the Device 1 steers along the beam 1546 contains the interference arising from that portion of the energy. Similarly, when steering along the beam 1545, the received signal strength also contains the interference arising from the reflected signal. However, both interference terms are relatively small because the signal from the Device 2 leaking towards direction 1554 is already attenuated by the Device 2's beamforming steering towards 1541. Consequently, the interference from the signals propagating along other dominant paths has negligible impact of the estimation accuracy of the dominant path direction.

Figure 16A:
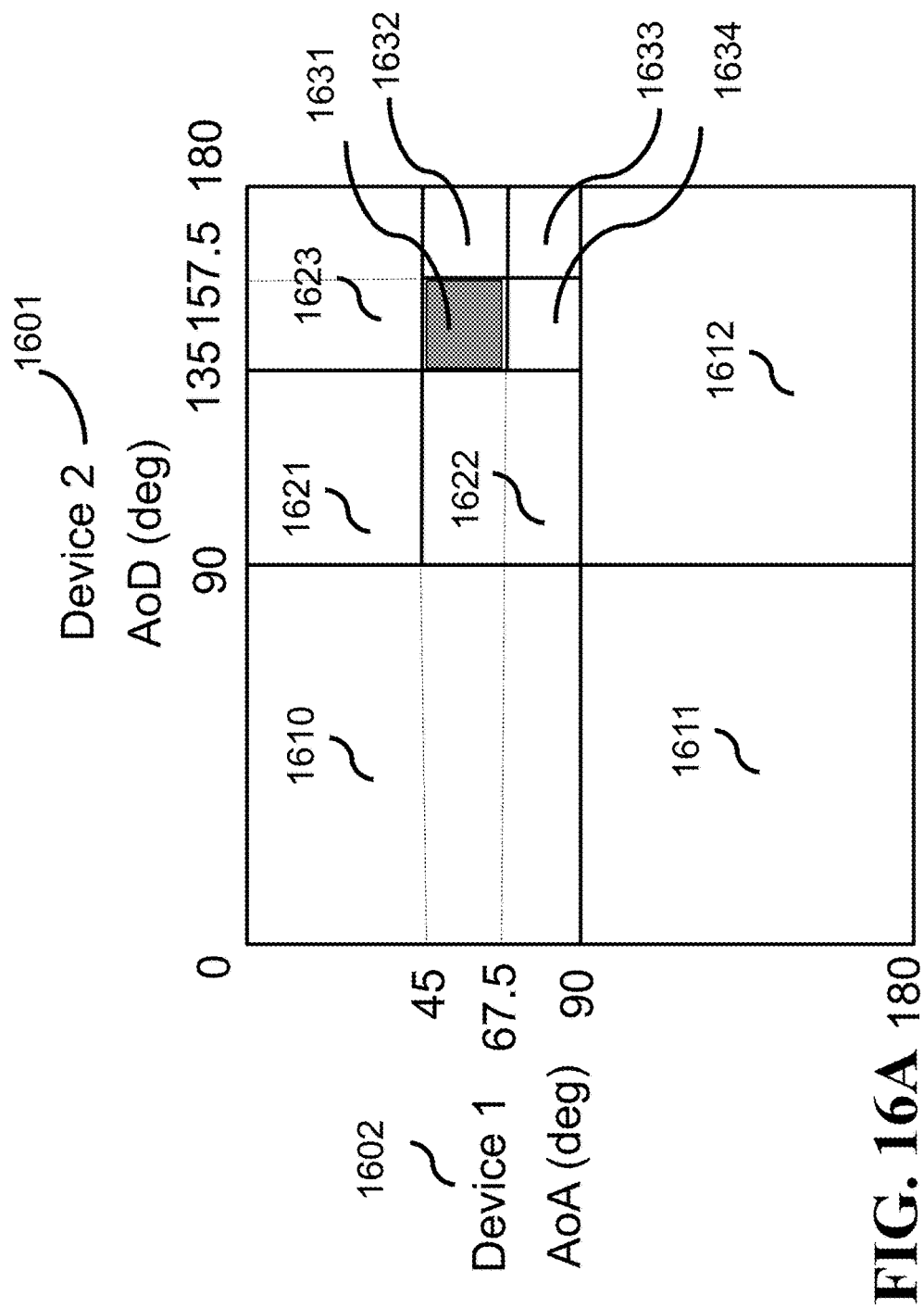
FIG. 16A shows a schematic of channel estimation used by some embodiments to determine the direction of the dominant path over which the two devices wirelessly communicate by using two, three or more pairs of beam values.

FIG. 16A shows a schematic of channel estimation used by some embodiments to determine the direction of the dominant path over which the two devices wirelessly communicate by using two, three or more pairs of beam values. Notably, the channel estimation stage probes multiple dominant paths and the communication link between the two devices is established over the one exhibiting the highest quality. For example, assuming two devices employ uniform line arrays, such that Device 2 is in transmit mode and Device 1 is in receive mode, FIG. 16A pictorially represents combinations of angles of departure (AoD) 1601 and angles of arrival (AoA) 1602 that have been probed during the channel training and/or estimation stage. The channel training stage reveals that the best communication link 1631 is the one established when the Device 2 steers the beam within the range of AoD angles (135°,157.5°), and the Device 1 steers the receive beam towards the range of angles (45°,67.5°).

In our previous examples, the embodiments estimate the direction of the dominant path within those transmit and receive beams. Then, with the estimate of the distance between the devices, the embodiments perform device localization. However, the alternative embodiments use the channel measurements over multiple dominant paths for localization. Namely, as indicated in FIG. 16A, the channel estimation stage measures the quality of the link established, for example 1610 for transmit beam (0°,90°) and receive beam (0°,90°) and similarly the combinations 1611, 1612, and with higher resolution beams 1621, 1622, 1623, and even higher resolution beams 1631, 1632, 1633 and 1634. Each transmit-receive beam combination corresponds to a certain dominant path. Just as we used at least two pairs of beam values to determine the dominant path direction, multiple groups of beam values can be utilized to determine directions of multiple dominant paths. In selecting the beam values, those associated with higher quality measures have precedence.

Figure 16B:
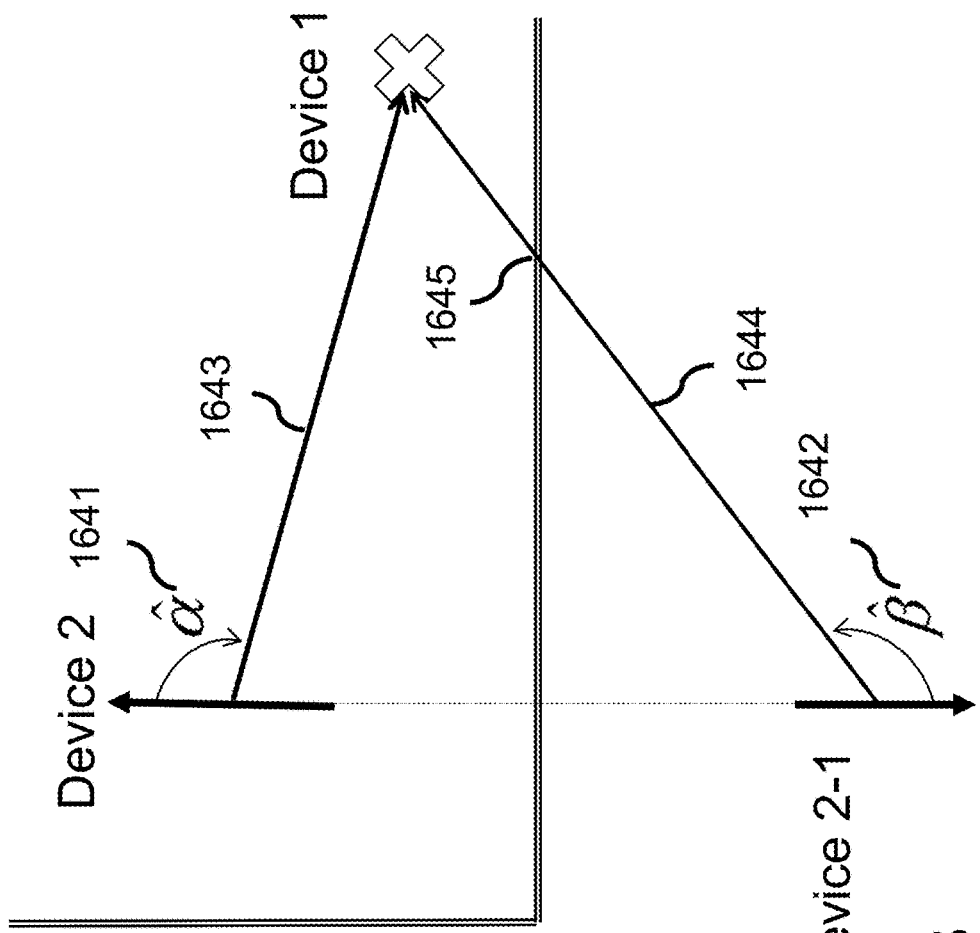
FIG. 16B shows a schematic of a triangulation used by some embodiments.

FIG. 16B shows a schematic of a triangulation used by some embodiments. Suppose that based on two groups of beam pairs, the directions of two dominant paths are determined. Referring to FIG. 16B, let the angles corresponding to those dominant paths be $\hat{\alpha}$ 1641 and $\hat{\beta}$ 1642. Therefore, a triangulation based on those two angles is sufficient to estimate the location of the Device 1. Specifically, the device localization comprises of detecting that the dominant path 1643 corresponding to $\hat{\alpha}$ is the LOS path, while the dominant path 1644 corresponding to $\hat{\beta}$ is the path with point of reflection 1645, equivalent to the LOS from the virtual Device 2-1.

Figure 16C:
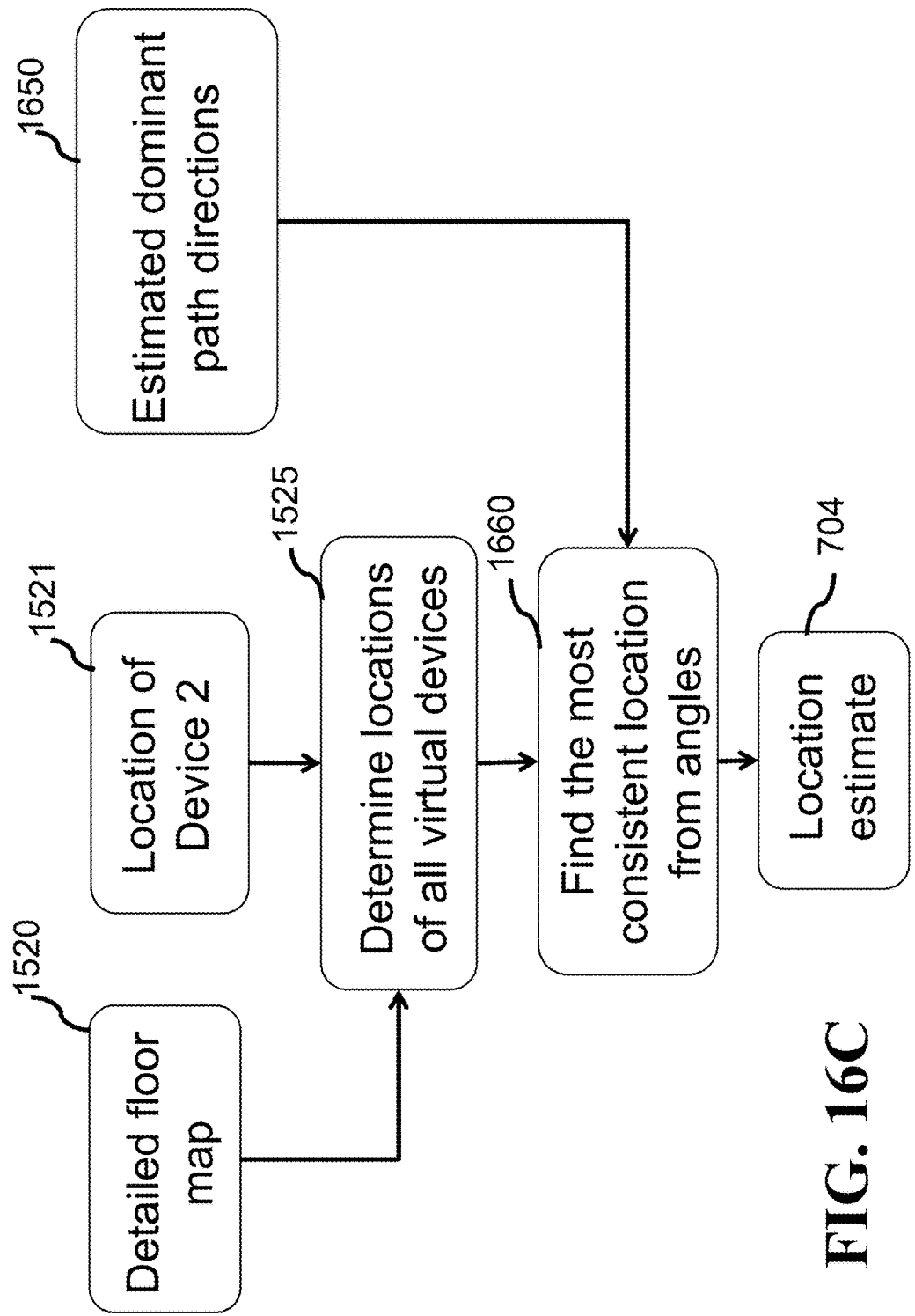
FIG. 16C shows a block diagram of a localization used by one embodiment.

FIG. 16C shows a block diagram of a localization used by one embodiment. The embodiment uses a map of the area 1520 and location of the Device 2 in the map 1521 in order to determine 1525 all virtual devices that explain one of more mmWave reflections. Using multiple sets of pairs of beam values, obtained in the channel estimation stage, the embodiment then determines directions of two or more dominant paths 1650. The location most consistent with the estimated angles is found 1660 and declared as the final device location estimate 704.

The location most consistent with the estimated angles can be determined in multiple ways. For example, one implementation traces lines from the Device 2 and its virtual images using the estimated angles, determines their intersections and finds the intersection most consistent with the map and, possible, beam values corresponding to the dominant paths. Another implementation divides the map into grid points and evaluates likelihood for each grid point, similar to Equation (18), with the difference that each angle contributes one term in the likelihood function. For example, assuming a grid point is at angles $\alpha_1$ and $\beta_1$ the likelihood is given by $$l_{i,j}(p) = \frac{1}{\sqrt{2\pi\sigma^2}} e^{\frac{(\hat{\alpha}-\alpha_1)^2}{2\sigma^2}} \frac{1}{\sqrt{2\pi\sigma^2}} e^{\frac{(\hat{\beta}-\beta_1)^2}{2\sigma^2}} \quad (19)$$

where i, j is any pair from the set comprising of the device and all its virtual images, while $\sigma^2$ is the variance of the estimation error, for example, calibrated from measurements. The device location p yielding largest likelihood over all i, j combinations and across all grid points p yields the final location estimate.

In some embodiments, the first and the second devices perform the channel estimation using a physical layer of a communication protocol and store the results of the channel estimation in a medium access control (MAC) layer of the communication protocol, and wherein the processor determines the direction of the dominant path only using information retrieved from the MAC layer. In such a manner, the indoor localization of some embodiments can be implemented on top of MAC layer of the communication protocol stack.

Figure 17:
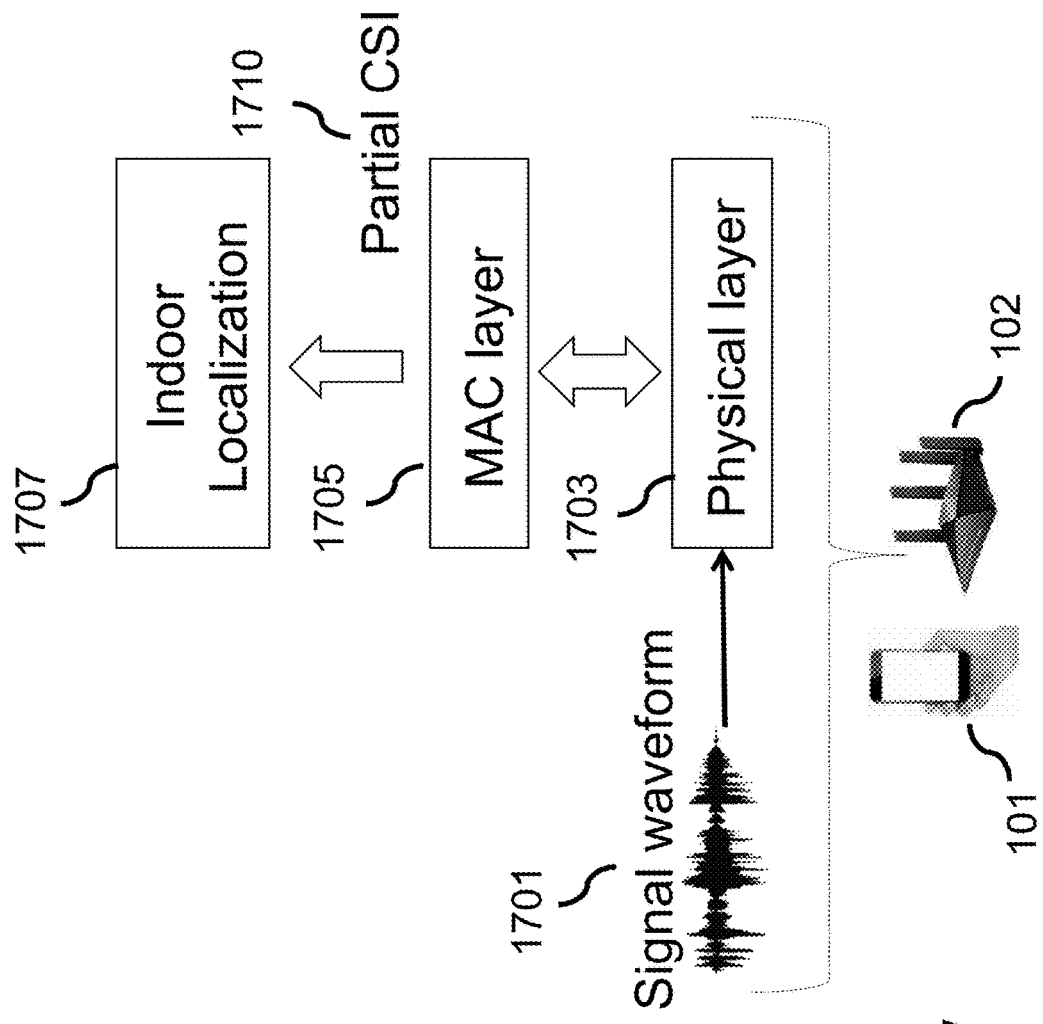
FIG. 17 shows a schematic of indoor localization according to some embodiments implemented on top of MAC layer of the communication protocol stack.

FIG. 17 shows a schematic of indoor localization according to some embodiments implemented on top of MAC layer of the communication protocol stack. As shown in FIG. 17, two devices 101 and 102 implement a mmWave communication protocol to wirelessly exchange information. The physical layer 1703 of the transmitter generates a signal waveform 1701 which is received and processed in physical layer 1703 of the receiver. The association of two devices and channel estimation stage are controlled by the MAC layer 1705. The channel estimation results, i.e., quality of the links formed by different combinations of transmit and receive beams are stored in the memory of the MAC layer. The indoor localization method 1707 is conceptually implemented on top of the MAC layer. This means that the indoor localization method does not have a direct access to the transmitted/received signal waveform. Instead, it only gets full or partial channel state information (CSI) 1710 from the MAC layer's memory.

The advantages of the implementation described in FIG. 17 are reduced cost and improved flexibility. Namely, there is no need to design, purchase and install new hardware. The whole method can be implemented in the firmware of the MAC layer of the mmWave communication chipset. In addition, as implemented, the indoor localization does not interfere with mmWave communications because it exploits the information the MAC layer of the communication protocol stack already has for the purpose of enabling communications. In a sense, all that information, i.e., partial CSI, really comes for free and can be used to facilitate indoor localization.

Figure 18:
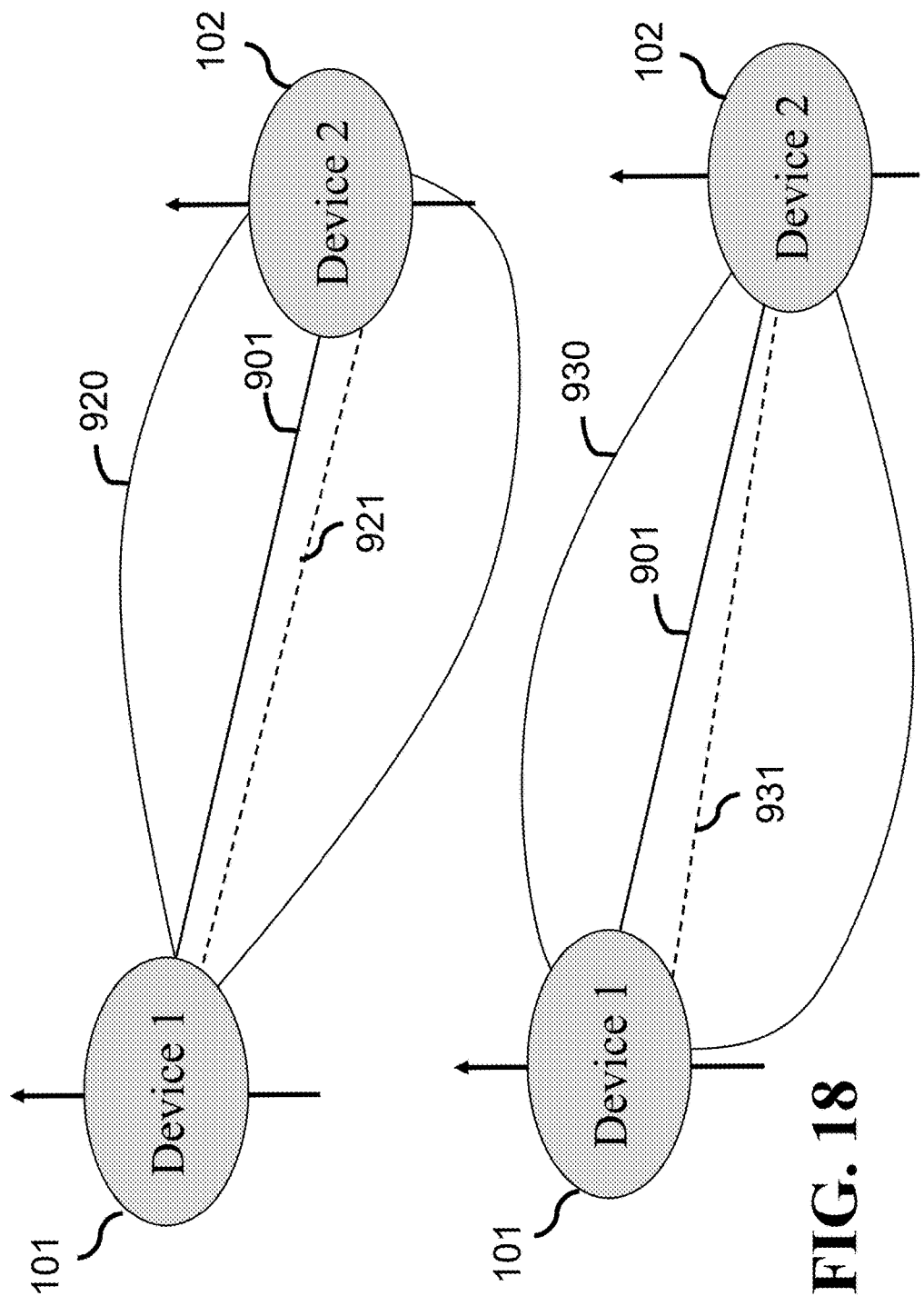
FIG. 18 shows a diagram of establishing a communication link according to some embodiments.

FIG. 18 shows a diagram of establishing a communication link according to some embodiments. In various embodiments, the transmitter and receiver use the measurements from the channel training stage to establish the communication link between them. In particular, the combination of the transmit and receive beam that yields the highest link quality are the beams the transmitter and receiver, respectively, implement to communicate data. Referring to FIG. 18, that means that the Device 2 steers transmitted signal toward 931, creating a beam 930, while the Device 1 steers toward 921 to receive the signal, thus creating the beam 920.

However, because the indoor localization method estimates the direction of the dominant path, enclosed with the transmit and receive beams determined in the channel estimation stage, in one embodiment, the devices can also communicate along the dominant path. In particular, in one implementation, after the indoor localization method estimates angles of the dominant path, the devices steer their beams towards those angles to establish a link along the dominant path. Notably, such a link is of better quality. Again referring to FIG. 18, the indoor localization method determines the direction of the dominant path 901 between the two devices. Hence, the Device 2 may transmit its signal by steering the signal towards the direction of the dominant path 901, while the Device 1 can receive the signal by steering towards the same direction of the dominant path 901.

Figure 19:
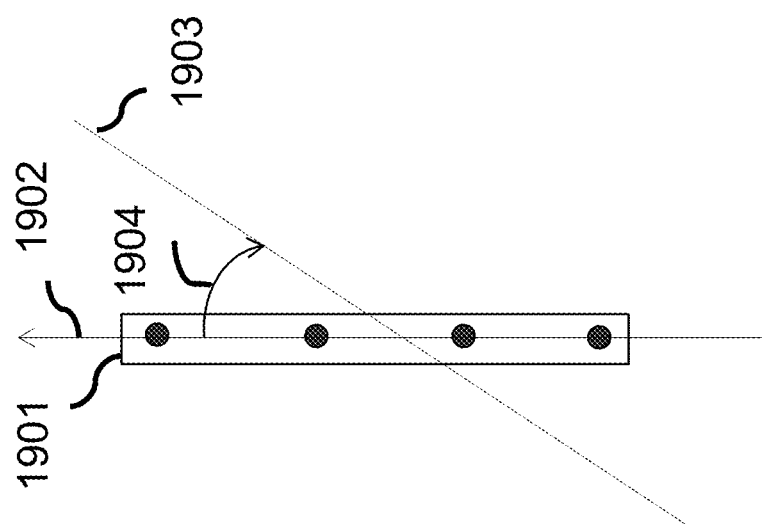
FIG. 19 shows a schematic illustrating the beamforming used by some embodiments to transmit and receive beams.

FIG. 19 shows a schematic illustrating the beamforming used by some embodiments to transmit and receive beams. The format of the beamforming angle depends on type of the array implemented in a device. For example, if a device implements a uniform line array, then only one angle defines the beamforming angle. As shown in FIG. 19, the angle 1904 of a direction 1903 of a wave being transmitted or received is measured with respect to a reference direction 1901. A uniform vertical line array can only resolve elevation angle with respect to the direction of the array, comprising the beamforming angle. If an array transmits a wave, this angle is referred to as the angle of departure (AoD). On the other hand, if an array receives a wave, this angle is referred to as the angle of arrival (AoA).

Figure 20:
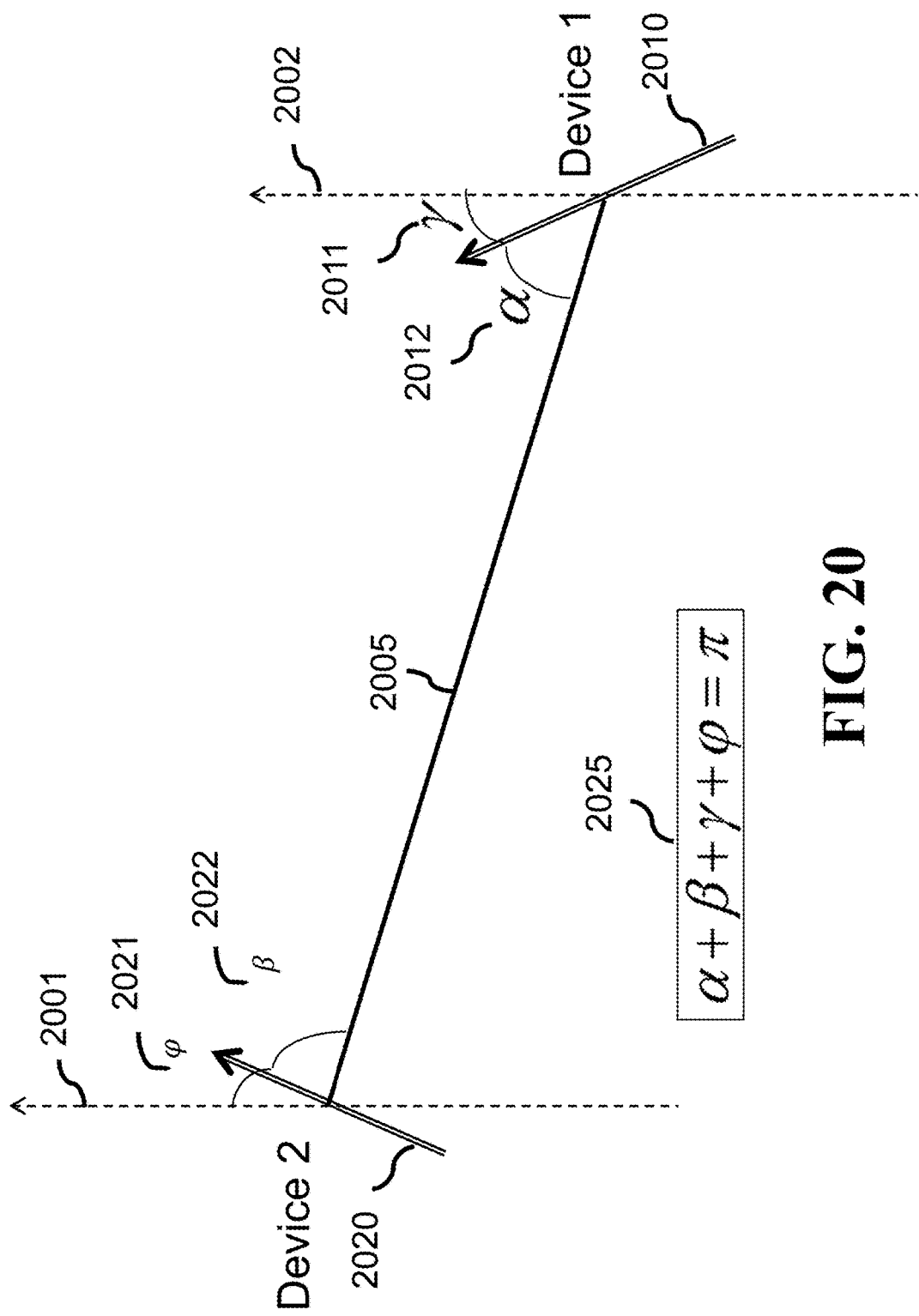
FIG. 20 shows a schematic of orientation of the communicating devices considered by some embodiments.

FIG. 20 shows a schematic of orientation of the communicating devices considered by some embodiments. In some implementations, the orientations of the arrays of both devices are known and accounted for in the estimation of the direction of the dominant path.

In general, two devices may have any random orientation. For example, a mobile terminal held by a user may have any orientation. As shown in FIG. 20, line arrays 2010 and 2020 of the Device 1 and Device 2, respectively, can exhibit random orientations. The orientations are measured with respect to reference direction 2001 and its copy 2002. As such, the Device 1 has orientation $\gamma$ 2011, while the Device 2 has orientation $\varphi$ 2021 with respect to the reference direction. The direction of the dominant path is described with the angles $\beta$ 2002 and $\alpha$ 2012. All these angles satisfy the relation 2025, that is $\alpha+\beta+\gamma+\varphi=\pi$. In case of other array geometries, other similar relations can be observed. From the relation 2025, some embodiments estimate at least three out of four angles involved.

First, the angles of the dominant path $\beta$ and $\alpha$ can be estimated using the described methods. A number of different combinations in terms of where estimation of angles happens are possible. Namely, each of the devices may estimate one of the angles and, if needed, share the estimates with the other device. Alternatively, both angles may be estimated by one device and, if needed, shared with the other device.

There are also multiple ways to estimate of orientations $\gamma$ and/or $\varphi$ of the devices. First, one of the orientations may be fixed and known in advance. This happens when one of the devices is an access point or base station, such that its orientation is always known if it implements line array; in case it implements some other geometry such as a planar array, then at least one orientation is known in advance. Second, one of both devices may be equipped with a sensor to measure orientation. This happens when one of the devices is a smart phone which already has gyroscope embedded to track its orientation.

Overall, any combination of measuring a subset of angles associated with the dominant path direction and a subset of orientations yielding the estimates of, in the case both devices implement line arrays, at least three out of four angles, can be used. Also, this whole estimation process may be implemented on one or both devices and the results can be shared, if necessary for the indoor localization method.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically, the functionality of the program modules may be combined or distributed as desired in various embodiments. A processor for performing a function, performing a function or configured to perform a function can be implemented using circuitry in any suitable format that is programmed or otherwise configured to perform the function without additional modifications.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A millimeter-wave (mmWave) communication system for determining a location of a first device based on a known location of a second device, comprising:
a transceiver connected to a set of antennas to communicate beams of mmWaves and to perform an estimation of a channel connecting the first device and the second device by comparing energy of beams communicated using mmWave beamforming over a set of beamforming angles, wherein neighboring beamforming angles in the set of beamforming angles are separated according to a resolution of the beamforming, and wherein values of the set of beamforming angles are independent from an angle of a direction of a dominant path connecting the first and the second device;
a memory to store results of the channels estimation including pairs of beam values, wherein each pair of beam values includes a beamforming angle and an energy of the beam communicated with the beamforming angle; and
a processor operatively connected to the memory and configured to
select from the memory multiple pairs of beam values corresponding to beamforming communication sharing the same dominant path connecting the first device and the second device;

determine a direction of the dominant path by evaluating a beamforming model for the selected pairs of beam values, wherein the beamforming model relates a deviation of a beamforming angle, caused by the resolution of the beamforming, from the dominant path with the energy of the beam transmitted with the beamforming angle and received over the dominant path; and determine the location of the first device arranged along the direction of the dominant path with respect to the location of the second device.

2. The communication system of claim 1, wherein the selected multiple pairs of beam values include two pairs of beam values with beamforming angles neighboring each other according to the resolution of the beamforming, and wherein the dominant path is the shortest path between the first and the second devices within an angle defined by the neighboring beamforming angles from the selected pairs of beam values.

3. The communication system of claim 1, wherein the beamforming model relates the deviation of the beamforming angle from the dominant path to the energy of the beam and an unknown distance between transceivers performing the beamforming, such that the beamforming model includes an ambiguity resolved by the processor with the selected multiple pairs of beam values.

4. The communication system of claim 1, wherein the selected multiple pairs of beam values include a first pair of beam values with the highest value of energy received during the channel estimation and include a second pair of beam values with the beamforming angle neighboring the beamforming angle of the first pair according to the resolution of the beamforming.

5. The communication system of claim 4, wherein the processor determines the direction of the dominant path consistent with the energies of beams in the first and the second pairs of beam values that are spread according to the beamforming model from the corresponding beamforming angles.

6. The communication system of claim 1, wherein the selected multiple pairs of beam values include at least three pairs of beam values, and wherein the processor fits the beam values into the beamforming model to produce the dominant path consistent with the three pairs of beam values.

7. The communication system of claim 1, wherein the processor determines a distance between the first and the second devices, and determines the location of the first device based on the distance along the direction of the dominant path.

8. The communication system of claim 7, wherein the processor obtains a time-of-flight of propagation of the beam over the dominant path and determines the distance between the first and the second devices based on the time-of-flight.

9. The communication system of claim 8, further comprising:
a sensor to measure the time-of-flight.

10. The communication system of claim 7, wherein the processor determines the distance using a path-loss model of mmWave signal propagation along the direction of the dominant path with the energy of the beam transmitted with the beamforming angle closest to the direction of the dominant path.

11. The communication system of claim 7, wherein the processor
checks whether the dominant path connects the first and the second devices via a direct line of sight using a path-loss model of mmWave signal propagation along the distance traveled over the direction of the dominant path;
determines the location at the distance from the second device along the direction of the dominant path when the dominant path connects the first and the second devices via the direct line of sight; and otherwise
determines a reflection of the dominant path using a map of environment surrounding the first and the second devices and adjusts the location of the first device according to the reflection.

12. The communication system of claim 1, wherein the processor is configured to
select from the memory multiple sets of pairs of beam values such that pairs of beam values from different sets use different dominant paths of the beamformed communication;
determine the dominant path for each set of pairs of beam values to produce a set of dominant paths; and
triangulate the dominant paths originating at the location of the second device to produce the location of the first device.

13. The communication system of claim 1, wherein the first and the second devices perform the channel estimation using a physical layer of a communication protocol and store the results of the channel estimation in a medium access control (MAC) layer of the communication protocol, and wherein the processor determines the direction of the dominant path only using information retrieved from the MAC layer.

14. The communication system of claim 1, wherein the second device is an access point (AP) connecting the first device to a network.

15. The communication system of claim 1, wherein transceivers communicate data between the first device and the second device using a beam with the beamforming angle determined during the channel estimation.

16. The communication system of claim 1, wherein transceivers communicate data between the first device and the second device using a beam with the beamforming angle along the direction of the dominant path.

17. The communication system of claim 1, wherein each beamforming angle includes an angle of departure of a communicated beam and an angle of arrival of the communicated beam.

18. A method for determining a location of a first device based on a known location of a second device using millimeter-wave (mmWave) beamforming, wherein the method uses a processor coupled with stored instructions implementing the method, wherein the instructions, when executed by the processor carry steps of the method comprising:
estimating a channel connecting the first device and the second device by comparing energy of beams communicated using the mmWave beamforming over different a set of beamforming angles separated according to a resolution of the beamforming to produce results of the channels estimation including pairs of beam values, wherein neighboring beamforming angles in the set of beamforming angles are separated according to a resolution of the beamforming, wherein values of the set of beamforming angles are independent from an angle of a direction of a dominant path connecting the first and the second device, and wherein each pair of beam values includes a beamforming angle and an energy of the beam communicated with the beamforming angle;

selecting multiple pairs of beam values corresponding to beamforming communication sharing the same dominant path connecting the first device and the second device;

determining a direction of the dominant path by evaluating a beamforming model for the selected pairs of beam values, wherein the beamforming model relates a deviation of a beamforming angle, caused by the resolution of the beamforming, from the dominant path with the energy of the beam transmitted with the beamforming angle and received over the dominant path; and determining the location of the first device arranged along the direction of the dominant path with respect to the location of the second device using at least some of the results of the channels estimation.

19. The method of claim 18, wherein the selected multiple pairs of beam values include two pairs of beam values with beamforming angles neighboring each other according to the resolution of the beamforming, and wherein the dominant path is the shortest path between the first and the second devices within an angle defined by the neighboring beamforming angles from the selected pairs of beam values.

20. A non-transitory computer readable storage medium embodied thereon a program executable by a processor for performing a method, the method comprising:

estimating a channel connecting the first device and the second device by comparing energy of beams communicated using the mmWave beamforming over different a set of beamforming angles separated according to a resolution of the beamforming to produce results of the channels estimation including pairs of beam values, wherein neighboring beamforming angles in the set of beamforming angles are separated according to a resolution of the beamforming, wherein values of the set of beamforming angles are independent from an angle of a direction of a dominant path connecting the first and the second device, and wherein each pair of beam values includes a beamforming angle and an energy of the beam communicated with the beamforming angle;

selecting multiple pairs of beam values corresponding to beamforming communication sharing the same dominant path connecting the first device and the second device;

determining a direction of the dominant path by evaluating a beamforming model for the selected pairs of beam values, wherein the beamforming model relates a deviation of a beamforming angle, caused by the resolution of the beamforming, from the dominant path with the energy of the beam transmitted with the beamforming angle and received over the dominant path; and determining the location of the first device arranged along the direction of the dominant path with respect to the location of the second device using at least some of the results of the channels estimation.

* * * * *